United States Patent
Guedalia et al.

(10) Patent No.: US 6,721,952 B1
(45) Date of Patent: Apr. 13, 2004

(54) METHOD AND SYSTEM FOR ENCODING MOVIES, PANORAMAS AND LARGE IMAGES FOR ON-LINE INTERACTIVE VIEWING AND GAZING

(75) Inventors: Jacob Leon Guedalia, Jerusalem (IL); Isaac David Guedalia, Bet Shemesh (IL)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 08/813,181

(22) Filed: Mar. 7, 1997

(30) Foreign Application Priority Data

Aug. 6, 1996 (IL) ................................................. 119021
Nov. 20, 1996 (IL) ................................................. 119654

(51) Int. Cl.[7] ........................... G06F 3/00; G06F 13/00; H04N 5/445
(52) U.S. Cl. ........................... 725/38; 725/86; 348/588; 345/783; 345/788
(58) Field of Search .............................. 725/38, 86, 89, 725/44, 40, 140, 132; 346/578, 580, 581, 588, 589; 345/783, 788; H04N 2/173, 5/445; G06F 3/00, 13/00

(56) References Cited

U.S. PATENT DOCUMENTS

| | | | |
|---|---|---|---|
| 4,752,836 A | 6/1988 | Blanton et al. | |
| 4,935,879 A | 6/1990 | Ueda | |
| 4,972,319 A | 11/1990 | Delorme | |
| 4,998,212 A | 3/1991 | Dedieu et al. | |
| 5,276,785 A | 1/1994 | Mackinlay et al. | |
| 5,396,583 A | 3/1995 | Chen et al. | |
| 5,414,455 A | 5/1995 | Hooper et al. | 348/7 |
| 5,421,031 A | 5/1995 | De Bey | 455/5.1 |
| 5,444,478 A | 8/1995 | Lelong et al. | |
| 5,487,167 A | 1/1996 | Dinallo et al. | 395/650 |
| 5,490,239 A | 2/1996 | Myers | |
| 5,512,934 A | 4/1996 | Kochanski | 348/7 |
| 5,521,841 A * | 5/1996 | Arman et al. | 345/723 |
| 5,528,281 A | 6/1996 | Grady et al. | 348/7 |
| 5,544,313 A | 8/1996 | Shachnai et al. | 395/200.01 |
| 5,561,791 A | 10/1996 | Mendelson et al. | 395/550 |
| 5,590,262 A | 12/1996 | Isadore-Barreca | |
| 5,623,308 A * | 4/1997 | Civanlar et al. | 348/392 |
| 5,649,032 A | 7/1997 | Burt et al. | |
| 5,666,475 A * | 9/1997 | Salesin et al. | 345/328 |
| 5,706,049 A | 1/1998 | Moghadam et al. | |
| 5,708,845 A | 1/1998 | Wistendahl et al. | |
| 5,884,056 A * | 3/1999 | Steele | 345/739 |
| 6,226,654 B1 * | 5/2001 | Van Hoff | 709/219 |
| 6,373,528 B1 * | 4/2002 | Bennington et al. | 725/44 |

FOREIGN PATENT DOCUMENTS

WO    PCT/IL97/00055    6/1997

OTHER PUBLICATIONS

Visdyn Software Corp., "The Jutvision Design Kit V1.0 User's Manual", Jul. 2, 1997, pp. 1–20.
Black Diamond Consulting., "Panoramic" ActiveX Control for Mac., http://www.Internetnews.Com/97Jan/0703–activex.Html., Jan. 7, 1997.
Live Picture Corp., "Live Picture OLIVR Corporation to Provide Superior Next–Generation Internet Imaging Solutions", http://www.olivr.com/press_release.Html. Jul. 14, 1997.

(List continued on next page.)

*Primary Examiner*—Vivek Srivastava
(74) *Attorney, Agent, or Firm*—Martine & Penilla, LLP

(57) ABSTRACT

This invention discloses apparatus and a method for producing a moving picture including providing a digital image including the content of a multiplicity of individual images defining a view window which may be selectably superimposed over at least a portion of the digital image at a given time, and moving the view window over the digital image such as to view at least portions of the multiplicity of the individual images in a desired sequence thereby to define the moving picture.

65 Claims, 12 Drawing Sheets

OTHER PUBLICATIONS

Live Picture Corp., "Live Picture Ships Photo Vista Image Stitching Software for Creating True–to–Life Panoramic Content Optimized for Quick Web Delivery", http://www/livepicture.com/press/release/p35.html. Jun. 30, 1997.

Live Picture Corp., "Live Picture Announces New Photo Vista Image Stitching Software for Creating Panoramas Optimized for the We", http://www.livepicture.com/press/releases/p32.html, Apr. 21, 1997.

Live Picture Corp., "Live Picture and RealSpace Rock the World Wide Web With Photo–Realistic Virtual Worlds", http://www.livepicture.com/press/releases/p13.html, Oct. 21, 1997.

Chen, S.E., Quicktime VR—An Image Based Approach to Virtual Environment Navigation, Siggraph: Computer Graphics Proceedings, Annual Conference Series, 1995, pp. 29–38.

* cited by examiner

METHOD AND SYSTEM FOR ENCODING MOVIES, PANORAMAS AND LARGE IMAGES FOR ON-LINE INTERACTIVE VIEWING AND GAZING

FIELD OF THE INVENTION

The present invention relates to methods and systems for displaying interactive three-dimensional object movie and panoramas.

BACKGROUND OF THE INVENTION

The following U.S. Patents have been found in a U.S. Patent Search and are believed to be generally relevant to the field of the invention:

U.S. Pat. No. 4,752,836 June 1988 Blanton et al. . . . 358/342

U.S. Pat. No. 5,396,583 March 1995 Chen et al. . . . 395/127

Interactive three-dimensional object movies and panoramas are becoming increasingly popular in entertainment and advertising over the Internet. These movies and panoramas enable the viewer to interact with the video stream and allow a great deal of functionality, such as the capability to rotate and move objects, zoom in and out, navigate through a panorama, link from one movie to another through the use of hot spots, and much more.

Principles of simulating a panorama from still images on a computer display are described in the following publications:

1. Blanton, K. A., Finlay, W. M., Sinclair, M. J. and Tumblin, J. E., *Method and Apparatus for Reproducing Video Images to Simulate Movement within a Multi-Dimensional Space*, U.S. Pat. No. 4,752,836, Jun. 21, 1988.
2. Chen, S. E., QuickTime® VR—An Image Based Approach to Virtual Environment Navigation, SIG-GRAPH: *Computer Graphics Proceedings*, Annual Conference Series, 1995, 29–38.
3. Chen, S. E. and Miller, G. S. P., *Cylindrical to Planar Image Mapping using Scanline Coherence*, U.S. Pat. No. 5,396,583, Mar. 7, 1995.

Conventional movies use a sequence of frames as input, and advance one frame at a time. Each time a new frame is to be displayed, it is necessary to clear an image buffer of any old frame data, and load the new frame. A view window is used to display part or all of each frame. Rapid advancement through the frames gives the viewer the appearance of continuous motion. In order to transmit a complete movie from a server to a client computer, it is thus necessary for the client to receive all of the frames, and for the frames to be organized into a sequenced database.

In processing large still images extremely high memory requirements may be encountered. An uncompressed 8½×11 inch photograph scanned in 24-bit color at 300 dpi requires approximately 25 MB of storage. Transmission of large image files is slow, but even after the files are received by the client computer, displaying them and carrying out simple manipulations are computationally intensive and require large amounts of computer memory. In particular, when viewing a sub-sampled version of the image, scaled to fit in a viewer's monitor screen, the operation of zooming in on a portion of the image can take several minutes on a personal computer containing a PENTIUM® processor.

Ideally, the viewer would like to focus on specific parts of the image and see various parts of the image at different scales, a process known as interactive "gazing." As zooming progresses, the display shows image tiles of increasingly higher resolution which cover correspondingly smaller areas of the full image. For large images, gazing is an ideal vehicle for information display on a computer monitor, since the image is too large to be displayed in its entirety at full scale. Moreover, whenever a large image is displayed at a low resolution scaled to the size of a computer display screen, the tendency of the viewer is to want to focus in on specific areas at higher resolution; that is, viewers prefer to see portions of the image at higher resolution rather than the full image at low resolution—portions which they can choose themselves. Conventional techniques make this impractical, however, due to the difficulty and slowness of transmitting and manipulating large digital images.

SUMMARY OF THE INVENTION

It is an object of the present invention to enhance the on-line delivery of digital images such as movies and panoramas, by using a novel data structure, which stores pre-manipulated image content in multiple image content units and downloading the data structure in a manner such that any of the stored image content units may be accessed at least a minimum quality prior to completion of downloading.

In accordance with a preferred embodiment of the present invention, the data structure is built by joining all of the image content units together into one large rectangular image. The large image is encoded, transmitted to client computers and decoded on the client computer side.

When the digital image is a movie, each image content unit constitutes a frame and the effect of advancing the frames is accomplished by moving a view window within the large image. The view window being displayed moves in such a way that it maintains the same relative position within each frame within the large image, so that advancement of the view window makes it seem as if the frames were being advanced. This can all be carried out very quickly, faster than if the frames were viewed independently in the conventional manner.

It is another objective of the present invention to enhance the on-line delivery of large still images at multiple resolutions, and to enable fast interactive gazing capability. In large still images, an image content unit may be a tile of the large still image. By applying the invention to multi-resolution tiles making up the image, joined together to form a long horizontal image, the client computer can quickly display a low resolution version of the full image, almost immediately after the data begins to stream, and can zoom in interactively by gazing at areas of interest. The choice as to which areas are of interest is completely in the hands of the producer.

The present invention seeks to simulate an interactive three-dimensional object movie or panorama on a computer display, as data is being received on-line. A multiplicity of individual frames are arranged so as to form a vertical strip. This vertical strip, when entered into the memory as a digital image, can be streamed from a server to a client in horizontal bands, enabling the client to begin viewing the object movie on-line as soon as the first few bands are received, while the server continues to transmit the rest of the data. As more data arrives, the client can view more of the object movie.

In order to view images and video on a computer display, a user, or client, retrieves the media from a storage device or server, typically connected via a network. Bandwidth limitations affect the amount of time required to transmit a video frame from the server to the client, and thus limit the video frame rate. Moreover, when dealing with object movies and panoramas, the images being transmitted are extremely large, so that overcoming bandwidth limitation is a critical enabling factor for the technology, even for high bandwidth networks. Currently, to overcome the limitations, two methods are used: The first is to compress the video frame sequence, thereby speeding up transmission time at the cost of additional processing to decompress the frames prior to display. The second is to copy the entire sequence to an intermediate storage device, such as a hard disk, to which the client has higher bandwidth access, at the cost of delaying the viewing of the video until the entire sequence has been delivered.

It is therefore desirable to provide a method for clients who are linked by a network to a server to view an object movie or panorama on-line. It is also desirable to enable the client to interact with the movie or panorama, by directly controlling the viewing window. A primary advantage of the present invention is to change the layout of the frame sequence from that of typically a long horizontal image in which the frames are joined horizontally left to right, to that of a long vertical image in which the frames are joined vertically top to bottom. The frames are decompressed in sequence as successive horizontal bands are processed. Specifically, the second frame, being positioned underneath the first frame, is only processed after the first frame is complete. Had the frames instead been maintained in the layout of a long horizontal image, each long horizontal band would span all of the frames, and no individual frame in the sequence would be ready for display until all of the frames are decompressed.

The virtual reality effect of the object movie or panorama is obtained by positioning a sliding view window over successive frames, as the user requests a directional move. The position of the display window on the client computer remains fixed, but the window of source image pixel data which is being displayed changes with each view. The availability of whole frame data in succession order enables the object movie or panorama to be progressively displayed. As each additional frame is decompressed, the viewer can move the object or explore the panorama to greater extent. Furthermore, as each additional frame slice is integrated, the quality of the frame is enhanced, until the entire data stream is received by the client. Thus the movie or panorama can begin to be displayed on the client computer almost immediately after transmission of the compressed data from server to client starts.

Had the object movie or panorama frames been compressed individually, as by progressive JPEG, and transmitted in parallel channels, there would be no control over the order in which frames slices are being received, since the individual channel transmissions take place asynchronously. Thus it is seen that joining the frames into a single long image also affords a mechanism for controlling the order in which the compressed frame data arrives at the client side. It is important to emphasize that for systems which require the codec to be compatible with a standard, as is the case with JPEG, for example, the joining of frames into a single long image is fully compliant, and does not necessitate introduction of a non-standard image format for the data streaming. It is also important to emphasize that there is a very large amount of data being transmitted, even after compression, and without progressive rendering the client would have to wait a long time until all of the data arrives and viewing could begin.

The JPEG standard is described by Pennebaker, W. B. and Mitchell, J. L. in *JPEG: Still Image Data Compression,* Van-Nostrand Reinhold, N.Y., 1993, the disclosure of which is herein incorporated by reference.

According to the present invention there is provided a method for simulating an interactive three-dimensional object movie or panorama on a computer display, as data is received on-line, comprising the steps of preparing a sequence of individual frames from an object movie or panorama video strip to form a long horizontal image, arranging said individual frames in a sequence from top to bottom to form a long vertical image, compressing said long vertical image, storing the compressed data on a server computer storage device, transmitting the compressed data to a client computer, decompressing the compressed data on-line to reconstruct said long vertical image on the client computer, while the compressed data is being transmitted, separating the individual frames from the long vertical image on the client computer, as they become available, re-joining the individual frames into a long horizontal image on the client computer, and progressively displaying sliding window views of said horizontal image to simulate interactive object motion or panorama navigation on the user computer display device, as the data for the complete construction of these views becomes available.

The invention further provides an image processing system operative on an object movie or panorama film strip for providing interactive on-line simulation of a three-dimensional object movie or panorama including an AID converter for converting the film strip into digital data, a production unit for converting the digital data into a long vertical digital image, an encoder for compressing said long vertical image so that it can be efficiently stored on a server computer storage device and further transmitted to a client computer, a transmitter for sending the compressed image data as a data stream to a client computer upon request, and a decoder for decompressing the data stream on the client computer into image data and arranging the image data into a form suitable for interactive display on-line, as the data is received.

The present invention seeks to simulate an interactive movie on a computer display, as data is being received on-line. A sequence of digital frames comprising views as seen within the movie is constructed out of a continuous video or a sequence of photographs taken from different viewing perspectives. The frames are assembled together as tiles to form a single large rectangular shaped image, which is then encoded and stored on a server. For the purposes of the present description, it is assumed specifically that the frames are joined into a single long horizontal image, but this is not essential.

The encoded data is transmitted to client computers and decoded on the client computer side, typically back into a long horizontal image. A viewing window is set up on the client computer side, enabling jumping from one position to another within the long horizontal image, the window remaining in the same position relative to the individual frames, but jumping from frame to consecutive frame. The viewing window is displayed in a fixed location on the client computer monitor. Together, the effect of advancing the viewing window as described above and fixing the display window give an appearance of motion, as if the individual frames of the movie were advancing. "Hot spots" can be mapped onto the long horizontal window, so that the viewer can link from one movie to another. When a hot spot is selected, the view window switches from within the current long horizontal image to another such image, corresponding to the movie to be linked, and the viewer then advances within the new movie.

A primary advantage of the present invention is that by embedding a movie within a single long horizontal image, the adjustment of the viewing window can be done by the highly optimized operating system display functions for bitmap images, within the same bitmap. This is faster than changing bitmaps with each successive viewing window, since the image buffer does not have to be continually reloaded. It becomes an even more significant advantage if the long horizontal image is encoded in the JPEG format. Had the movie frames been JPEG encoded independently of one another, without first assembling them together, then to view successive windows it would be necessary to decode successive JPEG images, which would dramatically slow down the playback speed. It would also reduce the data compression factor since (a) there would be more overhead, and (b) entropy encoding, such as Huffman and arithmetic compression, typically performs better when similar data sequences are merged, on account of the larger population on which the statistics base themselves.

Regarding the use of JPEG encoding, an important feature of the present invention is that it is compliant with the JPEG standard, since a single JPEG image is being stored for transmission.

Another advantage of the present invention is that there is no need for the client computer to arrange the frames in a sequenced database, since it is receives only a single image. If the frames had instead been sent independently as individual frames, then they would either have to be sequenced in a single stream, and then unpacked into a database on the client computer side, or else sent in parallel channels, in which case it would be necessary to synchronize the multiple streams. By sending the frames as one single large frame, all of this data management is avoided.

The present invention further includes a production tool for the content provider to carry out the assembling of the frames and the encoding. The tool also includes a decoder, enabling the producer to preview the movie. There is a feedback loop so that the producer can adjust the encoding parameters for fine tuning the production.

The present invention also applies to interactive audio. Rather than represent the audio media as several audio clips stored individually, the producer can join them into one long signal, and move from one segment to another by means of a sliding audio segment. The position of the sliding segment is adjusted in response to user commands interpreted through the mouse and keyboard.

The present invention can be used as an effective means of delivering large still digital images progressively on-line, and to enable fast interactive gazing capability on the part of the viewer. By means of the present invention, the viewer can interactively gaze at the image in areas of interest almost immediately after the streaming is initiated, as soon as a low resolution version is received and displayed, regardless of how large the image is. Upon gazing, the display quickly loads in the requested area of the image at the next higher resolution, enabling a fast zoom-in. To accomplish this, image tiles are formed from the original image at different resolutions and joined together into a long horizontal image.

Hot spots and links are generated to map each area of interest in a tile to the tile containing the area at the next higher resolution. The view window then moves from tiles of one resolution to tiles of the next higher resolution, in response to interactive user mouse clicks on hot spot areas, giving the appearance of zooming in. The choice of which areas of the image to mark with hot spots as areas of interest is in the hands of the producer.

It is also an object of the present invention to provide a method of applying JPEG compression to multiple images wherein the images are joined together end to end in a given direction as one large digital image for JPEG compression and JPEG decompression.

This method is particularly useful for interactively accessing progressive JPEG compressed multiple images prior to completion of progressive JPEG decompression thereof.

There is thus provided in accordance with a preferred embodiment of the present invention a method for presenting a broadcast moving picture including broadcasting stored images including partially overlapping images at different resolutions, and viewing some of the partially overlapping images at different resolutions in a desired sequence thereby to display the moving picture.

Further in accordance with a preferred embodiment of the present invention the stored images being stored with partial redundancy.

There is also provided in accordance with a preferred embodiment of the present invention a method for interactive gazing at a broadcast large digital image including broadcasting partially overlapping stored multiple resolution tiles of the large digital image, and selectably viewing portions of the partially overlapping multiple resolution tiles in a desired sequence thereby to effect interactive gazing.

Further in accordance with a preferred embodiment of the present invention the stored multiple resolution tiles being stored with partial redundancy.

Still further in accordance with a preferred embodiment of the present invention the large digital image being a panorama.

There is also provided in accordance with a preferred embodiment of the present invention apparatus for producing a moving picture including a digital image broadcaster providing individual images including at least partially overlapping images at different resolutions, and a viewer which selectably displays portions of the partially overlapping images at different resolutions in a desired sequence thereby to define the moving picture.

Further in accordance with a preferred embodiment of the present invention the individual images being stored with partial redundancy.

There is also provided in accordance with a preferred embodiment of the present invention apparatus for providing interactive gazing at a broadcast large digital image including a digital image broadcaster providing partially overlapping multiple resolution tiles of the large digital image, and a viewer which may selectably display portions of the partially overlapping multiple resolution tiles in a desired sequence, thereby to effect interactive gazing.

Further in accordance with a preferred embodiment of the present invention the multiple resolution tiles being stored with partial redundancy.

Still further in accordance with a preferred embodiment of the present invention the large digital image being a panorama.

There is also provided in accordance with a preferred embodiment of the present invention a digital image display system including a memory storing digital images including partially overlapping images at different resolutions in an interactively accessible data structure, and a digital data transmitter, downloading and transmitting to a remote user, via a public network, data stored in the memory in a manner such that the partially overlapping images at different resolutions may be interactively accessed by the remote user.

Further in accordance with a preferred embodiment of the present invention the digital images being stored in the memory with partial redundancy.

There is also provided in accordance with a preferred embodiment of the present invention a digital image display method including storing digital images including partially overlapping images at different resolutions in an interactively accessible data structure, and downloading and transmitting to a remote user, via a public network, the digital images in a manner such that the partially overlapping images at different resolution may be interactively accessed by the remote user.

Further in accordance with a preferred embodiment of the present invention the storing using partial redundancy.

There is also provided in accordance with a preferred embodiment of the present invention a method for simulating an interactive movie on a computer display from a sequence of digital frames, as data is received on-line, including the steps of storing partially overlapping image tiles at different resolutions for several of the digital frames, transmitting the partially overlapping image tiles for several of the digital frames to a client computer, and displaying window views of some of the partially overlapping image tiles for some of the digital frames in response to keyboard presses and mouse clicks by a user, to exhibit the same effect as if zooming in and out and advancing forward and backward through the digital frames, in order to simulate interactive motion on the client computer display device.

Further in accordance with a preferred embodiment of the present invention the storing using partial redundancy.

There is also provided in accordance with a preferred embodiment of the present invention an image processing system, operative on a sequence of individual digital frames to produce an on-line interactive movie, including a storage device for archiving partially overlapping image tiles of digital frames at different resolutions, a transmitter for delivering the partially overlapping image tiles of the digital frames at different resolutions to a client computer, and a monitor for displaying window views of some of the partially overlapping image tiles for some of the digital frames in response to keyboard presses and mouse clicks by a user, to exhibit the same effect as if zooming in and out and advancing forward and backward through the digital frames, in order to simulate interactive motion on the client computer display device.

Further in accordance with a preferred embodiment of the present invention the image tiles being stored in the storage device with partial redundancy.

There is also provided in accordance with a preferred embodiment of the present invention a method for progressively displaying a large digital image on a computer display, as data is received on-line, including the steps of forming partially overlapping image tiles at multiple resolutions from the original digital image, storing the image tiles, transmitting some of the image tiles to a client computer, and displaying portions of the image tiles in response to keyboard presses and mouse clicks by a user, exhibiting the same effect as if zooming in and out of the large image, in order to simulate interactive zooming on the client computer display device.

Further in accordance with a preferred embodiment of the present invention the storing using at least partial redundancy.

Still further in accordance with a preferred embodiment of the present invention the large digital image being a panorama.

There is also provided in accordance with a preferred embodiment of the present invention an image processing system for progressively displaying a large digital image on-line, including an image processor for forming partially overlapping image tiles at multiple resolutions from the original large digital image, a storage device for archiving the image tiles, a transmitter for delivering some of the image tiles to a client computer, and a monitor for displaying window views of some of the image tiles, in response to keyboard presses and mouse clicks by a user, to exhibit the same effect as if zooming in and out of the large digital image, in order to simulate interactive zooming on the client computer display device.

Further in accordance with a preferred embodiment of the present invention the image tiles being stored in the storage device with partial redundancy.

Still further in accordance with a preferred embodiment of the present invention the large digital image being a panorama.

There is also provided in accordance with a preferred embodiment of the present invention an image processing system operative on an object movie or panorama film strip for providing interactive on-line simulation of a three-dimensional object movie or panorama including an A/D converter for converting the film strip into digital data, a production unit for using the digital data to produce partially overlapping images at different resolutions, a storage device for storing the partially overlapping images at different resolutions, and a transmitter for sending some of the partially overlapping images at different resolutions to a client computer for interactive display on-line.

Further in accordance with a preferred embodiment of the present invention the partially overlapping images being stored in the storage device with partial redundancy.

There is also provided in accordance with a preferred embodiment of the present invention a method for producing interactive media including providing partially overlapping individual interactively accessible digital content units, defining a pointer which may be selectably pointed at one of the individual interactively accessible digital content units, and using the pointer to access portions of the individual interactively accessible digital content units in a desired sequence.

There is also provided in accordance with a preferred embodiment of the present invention apparatus for producing interactive media, including a digital file generator providing partially overlapping interactively accessible digital content units, a pointer which may be selectably pointed to one of the partially overlapping interactively accessible digital content units, and a user-operated pointer controller for using the pointer to access portions of the interactively accessible digital content units in a desired sequence.

There is also provided in accordance with a preferred embodiment of the present invention a method for producing a moving picture including providing a digital image including the content of several individual images, defining a view window which may be selectably superimposed over at least a portion of the digital image at a given time, and moving the view window over the digital image such as to view portions of the individual images in a desired sequence thereby defining the moving picture.

Further in accordance with a preferred embodiment of the present invention the individual images comprise images of an object in different orientations, whereby moving the view window over the individual images in different orientations provides a sensation of viewing movement of the object.

Still further in accordance with a preferred embodiment of the present invention the view window is superimposed sequentially over a portion of each of the individual images, so as view the same portion of the object in each of the individual images.

There is also provided in accordance with a preferred embodiment of the present invention a method for gazing at a large still image including providing a digital image including the content of partially overlapping multiple resolution tiles of the large still image, defining a view window which may be selectably superimposed over a portion of the digital image at a given time, and moving the view window over the digital image such as to view portions of the multiple resolution tiles in a desired sequence thereby to effect interactive gazing.

There is also provided in accordance with a preferred embodiment of the present invention apparatus for producing a moving picture including a digital image generator providing a digital image including the content of individual images, a view window which may be selectably superimposed over at least a portion of the digital image at a given time, and a user-operated view window controller for moving the view window over the digital image such as to view at least portions of the individual images in a desired sequence thereby to define the moving picture.

Further in accordance with a preferred embodiment of the present invention the individual images comprising individual images of an object in different orientations, whereby moving the view window over the individual images in different orientations provides a sensation of viewing movement of the object.

Still further in accordance with a preferred embodiment of the present invention the view window being superimposed sequentially over a portion of each of the individual images, so as to view the same portion of the object in each of the individual images.

There is also provided in accordance with a preferred embodiment of the present invention apparatus for providing gazing at a large still image including a digital image generator providing a digital image including the content of partially overlapping multiple resolution tiles of the large still image, a view window which may be selectably superimposed over at least a portion of the digital image at a given time, and a user-operated view window controller moving the view window over the digital image such as to view portions of the multiple resolution tiles in a desired sequence, thereby to effect interactive gazing.

There is also provided in accordance with a preferred embodiment of the present invention a digital image display system including a memory storing digital images in an interactively accessible data structure, which stores pre-manipulated image content in image content units, and a downloader downloading data stored in the memory in a manner such that any of the stored image content units may be accessed at at least a minimum quality prior to completion of downloading.

Further in accordance with a preferred embodiment of the present invention the data structure joins all of the image content units together into one large digital image.

Still further in accordance with a preferred embodiment of the present invention an encoder for encoding the large digital image and wherein the downloader transmits the encoded large digital image to a client computer where it is decoded.

Additionally in accordance with a preferred embodiment of the present invention the large digital image comprising a movie and each image content unit constituting a frame of the movie.

Moreover in accordance with a preferred embodiment of the present invention the large digital image comprising a large still image and each image content unit constituting a tile of the large still image at a given resolution, the image content units being redundant tiles of the large still image at varying resolutions.

Further in accordance with a preferred embodiment of the present invention a user-operated controller for advancing frames in the movie by moving a view window within the large digital image.

Still further in accordance with a preferred embodiment of the present invention the view window moves in such a way that it maintains the same relative position within each frame within the movies, so that advancement of the view window makes it seem as if the frames are being advanced.

Additionally in accordance with a preferred embodiment of the present invention a user-operated controller for user selectable gazing in the large still image by moving a view window within the large digital image.

There is also provided in accordance with a preferred embodiment of the present invention a digital image display method including storing digital images in an interactively accessible data structure, which stores pre-manipulated image content in image content units, and downloading data stored in the memory in a manner such that any of the stored image content units may be accessed at at least a minimum quality prior to completion of downloading.

Further in accordance with a preferred embodiment of the present invention the data structure joins all of the image content units together into one large digital image.

Still further in accordance with a preferred embodiment of the present invention encoding the large digital image and wherein the downloading transmits the encoded large digital image to a client computer where it is decoded.

Additionally in accordance with a preferred embodiment of the present invention the large digital image comprises a movie and each image content unit constitutes a frame of the movie.

Moreover in accordance with a preferred embodiment of the present invention the large digital image comprises a large still image and each image content unit constitutes a tile of the large still image at a given resolution, the image content units comprising redundant tiles of the large still image at varying resolutions.

Further in accordance with a preferred embodiment of the present invention advancing frames in the movie by moving a view window within the large digital image.

Still further in accordance with a preferred embodiment of the present invention the view window moves in such a way that it maintains the same relative position within each frame within the movies, so that advancement of the view window makes it seem as if the frames are being advanced.

Additionally in accordance with a preferred embodiment of the present invention user selectable gazing in the large still image by moving a view window within the large digital image.

Moreover in accordance with a preferred embodiment of the present invention the encoding and decoding operating according to a progressive JPEG algorithm.

There is also provided in accordance with a preferred embodiment of the present invention a method for simulating an interactive movie on a computer display from a sequence of digital frames, as data is received on-line, including joining the digital frames together to form a large digital image encoding the large digital image to generate encoded image data storing the encoded image data transmitting the encoded image data to a client computer upon request decoding the encoded image data to generate a reconstructed large digital image, and displaying moving window views of the reconstructed large digital image in a fixed display window, in response to keyboard presses and mouse clicks by a user, to exhibit the same effect as if advancing forward and backward through the digital frames, in order to simulate interactive motion on the client computer display device.

Further in accordance with a preferred embodiment of the present invention the steps of joining, encoding, storing, transmitting, and decoding are applied to several digital frame sequences, corresponding to several movies, linked together through hot spots.

Still further in accordance with a preferred embodiment of the present invention the step of storing includes storing hot spot locations and link information, along with the encoded image data.

Additionally in accordance with a preferred embodiment of the present invention transmitting hot spot locations and link information along with the encoded image data.

Moreover in accordance with a preferred embodiment of the present invention the step of displaying also uses said hot spot locations, and further includes the steps of processing mouse clicks by the user in hot spot locations to link to another of the reconstructed large digital images, and moving a window view from a position within the current large digital image to a position within the large digital image linked thereto at a hot spot.

Additionally in accordance with a preferred embodiment of the present invention a portion of the large digital image linked thereto is stored within the encoded data for the large digital image linked therefrom, and wherein moving the window view includes moving a window view from a position within the current large digital image linked therefrom to another position within the large digital image linked therefrom corresponding to the location of the portion of the image linked thereto contained therein, and moving a window view from the position within the large digital image linked therefrom to a corresponding position within the large digital image linked thereto.

Further in accordance with a preferred embodiment of the present invention the large digital image being a long horizontal image containing all of the individual movie frames .

Moreover in accordance with a preferred embodiment of the present invention the encoding and decoding operating according to a progressive JPEG algorithm.

There is also provided in accordance with a preferred embodiment of the present invention an image processing system, operative on a sequence of individual digital frames to produce an on-line interactive movie, including a stitching unit for assembling the digital frames together to form a large digital image an encoder for compressing the large digital image into encoded image data a storage device for archiving the encoded image data a transmitter for delivering the encoded image data to a client computer upon request a decoder for decompressing the encoded image data, to generate a reconstructed large digital image, and a monitor for displaying moving window views of the reconstructed large digital image in a fixed display window, in response to keyboard presses and mouse clicks by a user, exhibiting the same effect as if advancing forward and backward through the digital frames, in order to simulate interactive motion on the client computer display device.

Further in accordance with a preferred embodiment of the present invention the stitching unit, encoder, storage device, transmitter and decoder operating on several digital frame sequences, corresponding to several movies, linked together through hot spots.

Still further in accordance with a preferred embodiment of the present invention the storage device archiving the location and link information of the hot spots along with the encoded image data.

Additionally in accordance with a preferred embodiment of the present invention the transmitter delivers the hot spot and link information, along with the encoded image data.

Moreover in accordance with a preferred embodiment of the present invention the monitor using hot spot locations to display moving window views, by means of a processing unit for processing mouse clicks by the user in hot spot locations in order to link to another of the reconstructed large digital images, and a pointer in memory for moving the window view from a position within the current large digital image to a position within the large digital image which is linked thereto at the hot spot locations.

Moreover in accordance with a preferred embodiment of the present invention a portion of the large digital image linked thereto is stored within the encoded data for the large digital image linked therefrom, and wherein the pointer in memory includes a pointer in memory for moving the window view from a position within the current large digital image linked therefrom to another position within the large digital image linked therefrom corresponding to the location of the portion of the image linked thereto contained therein, and another pointer in memory for moving the window view from the position within the large digital image linked therefrom to a corresponding position within the large digital image linked thereto.

Further in accordance with a preferred embodiment of the present invention the large digital image being a long horizontal image containing individual movie frames.

Moreover in accordance with a preferred embodiment of the present invention the encoder and decoder operating according to a progressive JPEG algorithm.

There is also provided in accordance with a preferred embodiment of the present invention a method for simulating interactive audio on a computer sound card from a sequence of digital audio clips, as data is received on-line, including joining the digital clips together to form a long digital signal encoding the long signal to generate encoded audio data, storing the encoded audio data, transmitting the encoded audio data to a client computer upon request, decoding the encoded audio data to generate a reconstructed long digital signal, and playing changing segments of the reconstructed long signal on a sound card, in response to keyboard presses and mouse clicks by a user, to exhibit the same effect as if advancing through the digital audio clips.

There is also provided in accordance with a preferred embodiment of the present invention an audio processing system operative on a sequence of digital audio clips, to produce on-line interactive audio, including a stitching unit for joining the digital audio clips together to form a long digital signal, an encoder for compressing the long digital signal into encoded audio data, a storage device for archiving the encoded audio data, a transmitter for delivering the encoded audio data to a client computer upon request, a decoder for decompressing the encoded audio data to generate a reconstructed long digital signal, and a sound player for playing changing segments of the reconstructed signal, in response to keyboard presses and mouse clicks by a user, exhibiting the same effect as if advancing through the digital audio clips.

There is also provided in accordance with a preferred embodiment of the present invention a method for progressively displaying a large digital image on a computer display, as data is received on-line, including forming image tiles from the original digital image at multiple resolutions, joining the image tiles together to form a large digital image, encoding the large digital image to generate encoded image data, storing the encoded image data, transmitting the encoded image data to a client computer upon request, decoding the encoded image data to generate a reconstructed large digital image, and displaying moving window views of the reconstructed horizontal image in a fixed display window, in response to keyboard presses and mouse clicks by a user, exhibiting the same effect as if zooming in and out of the large image, in order to simulate interactive zooming on the client computer display device.

Further in accordance with a preferred embodiment of the present invention the large digital image being a long horizontal image containing all of the image tiles.

Moreover in accordance with a preferred embodiment of the present invention the encoding and decoding operating according to a progressive JPEG algorithm.

There is also provided in accordance with a preferred embodiment of the present invention an image processing system for progressively displaying a large still image on-line, including an image processor for forming image tiles from the original large still image at multiple resolutions, a stitching unit for joining the image tiles together to form a large digital image, an encoder for compressing the large digital image into encoded image data, a storage device for archiving the encoded image data, a transmitter for delivering the encoded image data to a client computer upon request, a decoder for decompressing the encoded image data to generate a reconstructed large digital image, and a monitor for displaying moving window views of the reconstructed large digital image in a fixed display window, in response to keyboard presses and mouse clicks by a user, to exhibit the same effect as if zooming in and out of the large still image, in order to simulate interactive zooming on the client computer display device.

Further in accordance with a preferred embodiment of the present invention the large digital image being a long horizontal image containing all of the image tiles.

Still further in accordance with a preferred embodiment of the present invention the encoder and decoder operating according to a progressive JPEG algorithm.

There is also provided in accordance with a preferred embodiment of the present invention a method for simulating an interactive three-dimensional object movie or panorama on a computer display, as data is received on-line, including arranging a sequence of individual digital frames from an object movie or panorama video strip in a sequence from top to bottom to form a long vertical image, compressing the long vertical image, storing the compressed data, transmitting the compressed data to a client computer decompressing the compressed data on-line to reconstruct the long vertical image on the client computer, while the compressed data is being transmitted, and progressively displaying selected window views to simulate interactive object motion or panorama navigation on the client computer display device, as the data for the complete construction of these views becomes available.

Further in accordance with a preferred embodiment of the present invention separating the individual frames from the long vertical image on the client computer, as they become available, and joining the individual frames into a large digital image on the client computer, and wherein the step of progressively displaying operating by displaying sliding window views of the large digital image.

Still further in accordance with a preferred embodiment of the present invention the compressing of the long vertical image is performed by encoding horizontal bands of image data in succession.

Additionally in accordance with a preferred embodiment of the present invention the compressing is performed by a JPEG encoder.

Moreover in accordance with a preferred embodiment of the present invention the compressing of the long vertical image is carried out in a progressive mode, resulting in a series of compressed data slices.

Further in accordance with a preferred embodiment of the present invention the compressing is performed by a progressive mode JPEG encoder.

Still further in accordance with a preferred embodiment of the present invention the storing of the compressed data creates a single stream database of compressed image data on the server, and the transmission of the compressed data uses a single data channel.

Additionally in accordance with a preferred embodiment of the present invention the storing of the compressed data creates a multiple stream database of compressed image data on the server, and the transmission of the compressed data uses multiple data channels.

Moreover in accordance with a preferred embodiment of the present invention the decompressing of the compressed data is performed by decoding horizontal bands of image data in succession.

Further in accordance with a preferred embodiment of the present invention the decompressing is performed by a JPEG decoder.

Still further in accordance with a preferred embodiment of the present invention the decompressing of the compressed data is carried out in a progressive mode, resulting in a series of decompressed data slices.

Additionally in accordance with a preferred embodiment of the present invention the decompressing is performed by a progressive mode JPEG decoder.

Moreover in accordance with a preferred embodiment of the present invention the decompressing of the compressed data comprises the steps of decompressing the individual compressed image slices, and integrating the slices as they become available so as to obtain successively enhanced video frames.

Further in accordance with a preferred embodiment of the present invention the progressive displaying is carried out by a viewing window which jumps from frame to frame, as each successive frame is made available.

Still further in accordance with a preferred embodiment of the present invention the progressive displaying is carried out by a viewing window which moves smoothly from frame to frame, as each successive frame is made available.

There is also provided in accordance with a preferred embodiment of the present invention apparatus for simulating an interactive three-dimensional object movie or panorama on a computer display, as data is received on-line, including a frame composer arranging a sequence of individual digital frames from an object movie or panorama video strip in a sequence from top to bottom to form a long vertical image, a compressor compressing the long vertical image, a memory storing the compressed data, a transmitter transmitting the compressed data to a client computer, a decompressor decompressing the compressed data on-line to reconstruct the long vertical image on the client computer, while the compressed data is being transmitted, and a display driver progressively displaying selected window views to simulate interactive object motion or panorama navigation on the client computer display device, as the data for the complete construction of these views becomes available.

Further in accordance with a preferred embodiment of the present invention a frame separator separating the individual frames from the long vertical image on the client computer, as they become available, and a stitching device joining the individual frames into a large digital image on the client computer, wherein the display driver operates by displaying sliding window views of the large digital image.

Still further in accordance with a preferred embodiment of the present invention the compressor operating on the long vertical image by encoding horizontal bands of image data in succession.

Additionally in accordance with a preferred embodiment of the present invention the compressor comprising a JPEG encoder.

Moreover in accordance with a preferred embodiment of the present invention the compressor operates on the long vertical image in a progressive mode, resulting in a series of compressed data slices.

Further in accordance with a preferred embodiment of the present invention the compressor comprises a progressive mode JPEG encoder.

Still further in accordance with a preferred embodiment of the present invention the memory including a single stream database of compressed image data on the server, and the transmitter employing a single data channel.

Additionally in accordance with a preferred embodiment of the present invention the memory including a multiple stream database of compressed image data on the server, and the transmitter employing multiple data channels.

Moreover in accordance with a preferred embodiment of the present invention the decompressor operating by decoding horizontal bands of image data in succession.

Further in accordance with a preferred embodiment of the present invention the decompressor comprising a JPEG decoder.

Still further in accordance with a preferred embodiment of the present invention the decompressor operating on the compressed data in a progressive mode, resulting in a series of decompressed data slices.

Additionally in accordance with a preferred embodiment of the present invention the decompressor comprising a progressive mode JPEG decoder.

Moreover in accordance with a preferred embodiment of the present invention the decompressor operating on the compressed data by decompressing the individual compressed image slices, and integrating the slices as they become available so as to obtain successively enhanced video frames.

Further in accordance with a preferred embodiment of the present invention the display driver operating by causing a viewing window to jump from frame to frame, as each successive frame is made available.

Still further in accordance with a preferred embodiment of the present invention the display driver operates by causing a viewing window to move smoothly from frame to frame, as each successive frame is made available.

There is also provided in accordance with a preferred embodiment of the present invention an image processing system operative on an object movie or panorama film strip for providing interactive on-line simulation of a three-dimensional object movie or panorama including an A/D converter for converting the film strip into digital data, a production unit for converting the digital data into a long vertical digital image, an encoder for compressing the long vertical image so that it can be efficiently stored on a server computer storage device and further transmitted to client computers, a transmitter for sending the compressed image data as a data stream to a client computer upon request, and a decoder for decompressing the data stream on the client computer into image data, and arranging the image data into a form suitable for interactive display on-line, as the data is received.

Further in accordance with a preferred embodiment of the present invention the encoder comprising a progressive compressor and a bit rate controller, for producing compressed image slices.

Still further in accordance with a preferred embodiment of the present invention the decoder comprises a progressive decompressor for the compressed slices and integrator for accumulating the slices into image data.

There is also provided in accordance with a preferred embodiment of the present invention a method for producing interactive media including providing a digital file including content of individual interactively accessible digital content units, defining a pointer which may be selectably pointed at at least a portion of the digital file at a given time, and moving the pointer over the digital file so as to access portions of the individual interactively accessible digital content units in a desired sequence.

Further in accordance with a preferred embodiment of the present invention storing the digital file in an interactively accessible data structure, and downloading the digital file in a manner such that any of the stored multiplicity of individual interactively accessible digital content units may be accessed at at least a minimum quality prior to completion of downloading.

There is also provided in accordance with a preferred embodiment of the present invention apparatus for producing interactive media, said apparatus including a digital file generator providing a digital file including the content of interactively accessible digital content units, a pointer which may be selectably pointed to a portion of the digital file at a given time, and a user-operated pointer controller for moving the pointer over the digital image such as to view portions of the interactively accessible digital content units in a desired sequence.

Further in accordance with a preferred embodiment of the present invention a memory storing the digital file in an interactively accessible data structure, and a downloader downloading data stored in the memory in a manner such that any of the stored individual interactively accessible digital content units may be accessed at at least a minimum quality prior to completion of downloading.

The following definitions are employed throughout the specification and claims:

RESOLUTION—The relationship between the number of digital samples per unit of an original and the number of digital samples per unit in a rendered version thereof. Specifically, when dealing with images, resolution refers to the relationship between the number of pixels per unit area of an original image or scene and the number of pixels per unit area in a displayed image.

QUALITY—The degree to which a rendered version of an original is faithful to the original. Specifically, when dealing with images, quality refers to the degree to which the displayed image is faithful to the original image or scene. Normally this is expressed as the degree to which the approximation of pixel values in the displayed image approaches the correct pixel values in the original image or scene. Specifically, when dealing with audio, quality refers to the degree to which a played sound is faithful to the original sound.

FRAME—A portion of an original which can be independently and interactively manipulated. Specifically, when dealing with images, frame refers to a portion of an image or of a collection of images which can be independently and interactively manipulated.

TILE—A window sized pixel array of a predetermined given size forming part of an image. For example, tiles partition an image into a plurality of arrays, each of which contains an identical number of pixels.

BAND—A collection of digital image pixels which form a horizontal strip of the image. Typically image compression and decompression proceeds in-bands. Within the JPEG algorithm, for example, the bands are 8 pixels wide.

SLICE—A sequentially transmitted collection of partial data which is used to build multiple frames. The frames are built up of one or more sequentially transmitted slices, whose contents are accumulated. Specifically, when dealing with images, the slice contains image data. Specifically when dealing with audio, the slice contains audio data.

INTERACTIVE—characterizing an application or functionality in which user selected portions of data in a file are repeatedly accessed in a typical operation.

DETAILED DESCRIPTION OF PREFERRED EMBODIMENTS

Figure 1:
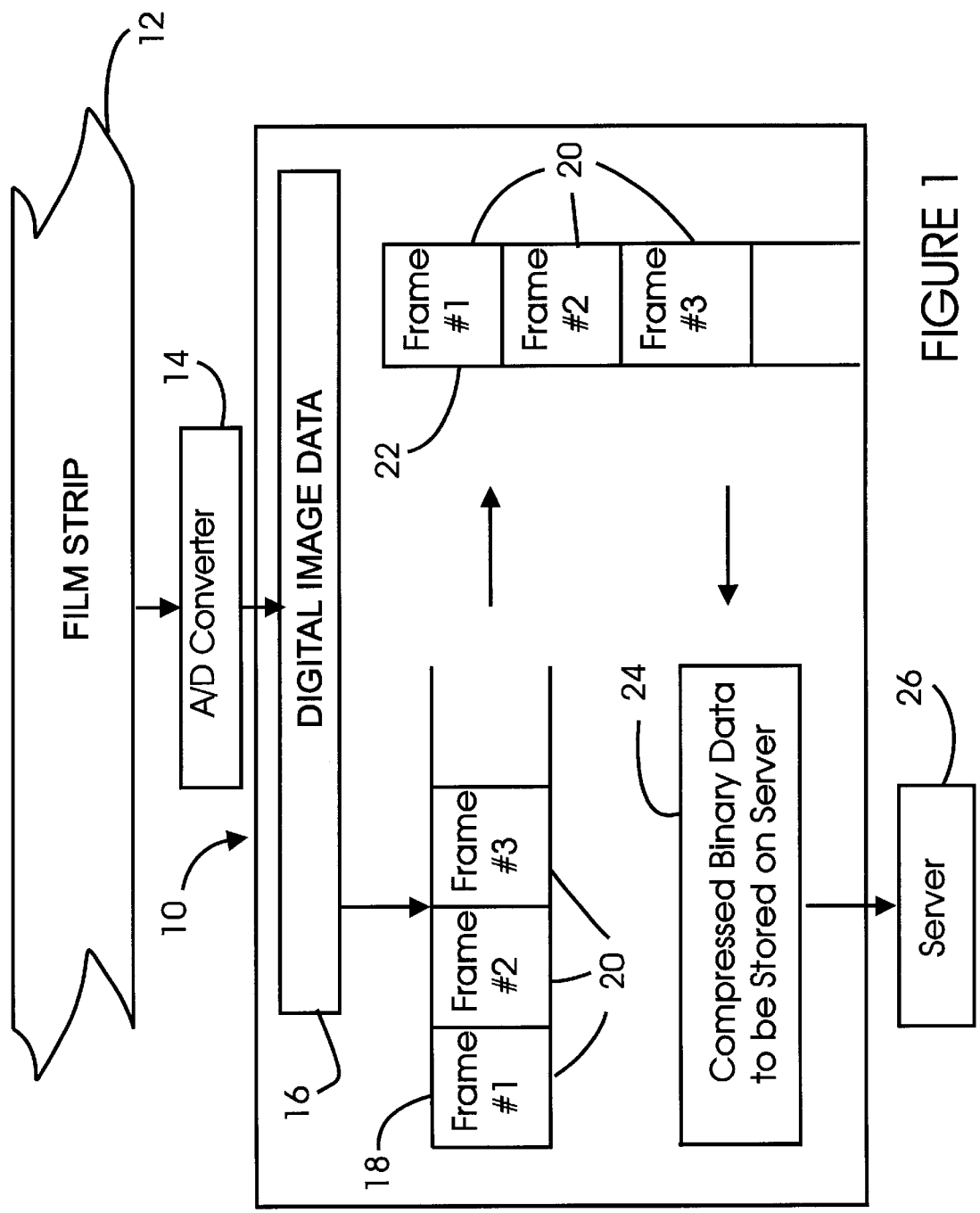
FIG. 1 is a simplified diagram of a production tool which operates on a digitized object movie or panorama film strip producing an intermediate sequence of frames for processing, and writing a compressed data file for storage on a server.

The present invention describes a method and apparatus for simulating an interactive three-dimensional object movie or panorama on a computer display, as data is being received on-line. As seen in FIG. 1, which illustrates one embodiment of the present invention, a production unit 10 utilizes an ordinary video strip 12, which is converted into digital form in an A/D converter 14 and then stored in a memory 16. The digital image data is stored as a large digital image, typically a horizontal digital image 18, from which image frames 20 are cut out. The frames 20 preferably are then re-organized in memory one on top of the other, forming a long vertical image 22.

Figure 2:
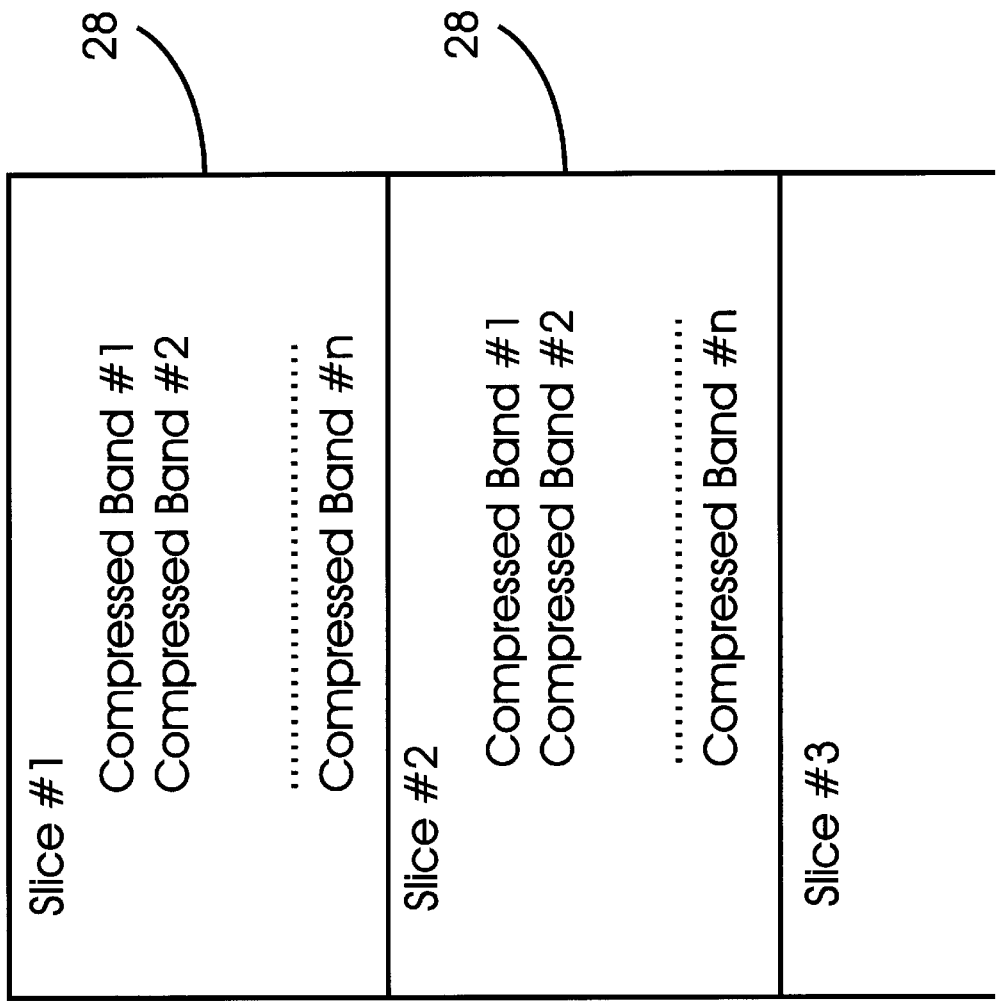
FIG. 2 is a simplified diagram of an encoder database for progressive image transmission, categorized into slices and bands.

The image 22 is then compressed in bands, as exemplified in a standard JPEG codec, by a compressor unit 24, and the compressed file is stored on a server 26. If, in addition, the compression algorithm used has progressive capability, as exemplified in the progressive JPEG algorithm, then the image 22 can be compressed into successive slices 28, as illustrated in FIG. 2, thus resulting in a compressed image database comprised of frames 20 and slices 28, wherein each slice 28 includes image data relating to all of the frames. Each slice comprises multiple bands, which are received sequentially, each band usually including image data relating to only one of the frames.

The entire process is governed by the production unit 10, enabling the producer to control the sizes of the slices 28, thereby controlling the bit-rate for the target bandwidth.

Figure 3:
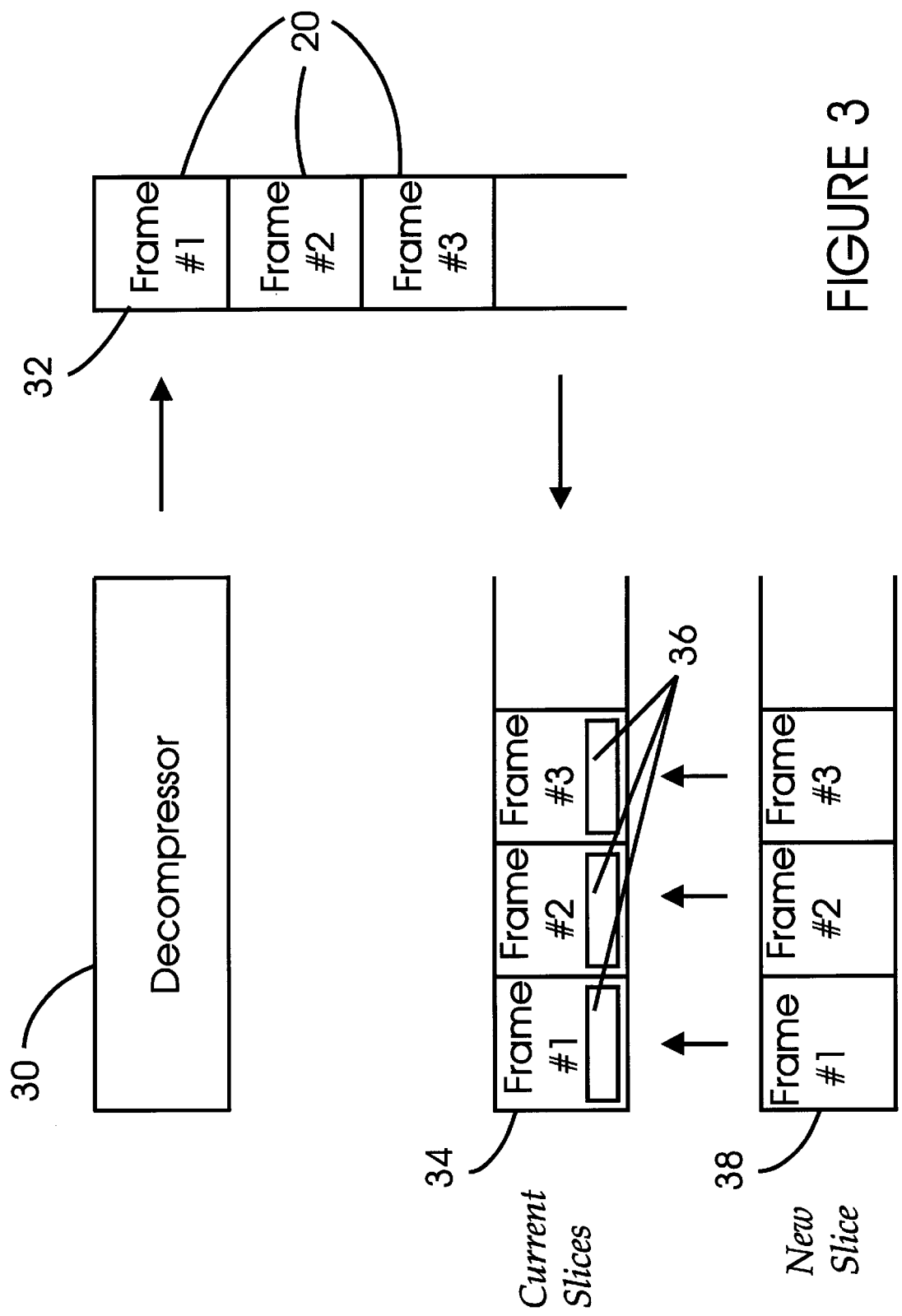
FIG. 3 is a simplified diagram of a decoder which operates on compressed object movie or panorama data and is capable of interactively displaying the object movie or panorama on-line, as data is being received.

FIG. 3 depicts the client computer side. As the compressed image data is received, a decompressor unit 30 decodes the image into bands. Due to the arrangement of the frames in image 22, each decompressed band in the long vertical image 32 is in fact an entire band of a frame 20 in the sequence, and is thus ready for display. As successive bands are made available and additional frames are decompressed, the frames are typically laid together side by side in memory, forming a long horizontal image 34, much like the original film strip. By laying the images together in this way, the client can view the sequence continuously in a seamless way, using a sliding view window 36, which jumps from frame to frame (in the case of an object movie) or pans continuously (in the case of a panorama), as the frames are made available by decompressor 30.

If the compressor operates in a progressive mode, as exemplified in the progressive JPEG encoder, then bands 28 of the additional slices can be integrated with the decoded bands of previous slices, to form successively higher quality frames over time.

Specifically, the following computation illustrates the transition in computer memory addressing from a long vertical image layout to a long horizontal image layout. The number of frames 20 is denoted by N and the height and width of each frame (in pixels) by h and w, respectively, and the size of a pixel (in bytes) is denoted by s. For example, s=1 corresponds to a monochrome image and s=3 corresponds to a true color image. Ignoring byte alignment, the long horizontal image in the decoder is stored in a chunk of memory, say char *buf, allocated with Nhws contiguous bytes. Suppose the decoder reconstructs the image data in horizontal bands, each of b scan lines (for the JPEG decoder, which operates on units of 8×8 pixel blocks, b=8), and stores each decoded band in a temporary memory buffer.

Then, assuming that h is an integral multiple of b, line number l (0≦l<b) of band number k (0≦k<Nh/b) is stored in contiguous memory beginning at address $$buf + ((bk + l) \% h)Nws + \frac{bk + l}{h}ws.$$

In the case where the long vertical image was progressively encoded, successive decoder passes produce new horizontal image slices 38, formed by horizontally joining together frames which evolve from the decoder in bands, in the same manner as the earlier slices were formed. Bands extracted from the new slices are accumulated with the corresponding bands from earlier slices in a progressive manner, as illustrated in FIG. 3. As each new slice is accumulated the overall image quality is enhanced over time.

While the present invention describes the use of progressive JPEG image compression within on-line virtual reality software systems, and this is a preferred embodiment of the invention, it will be appreciated that the present invention applies also to practically all data compression algorithms.

Figure 4:
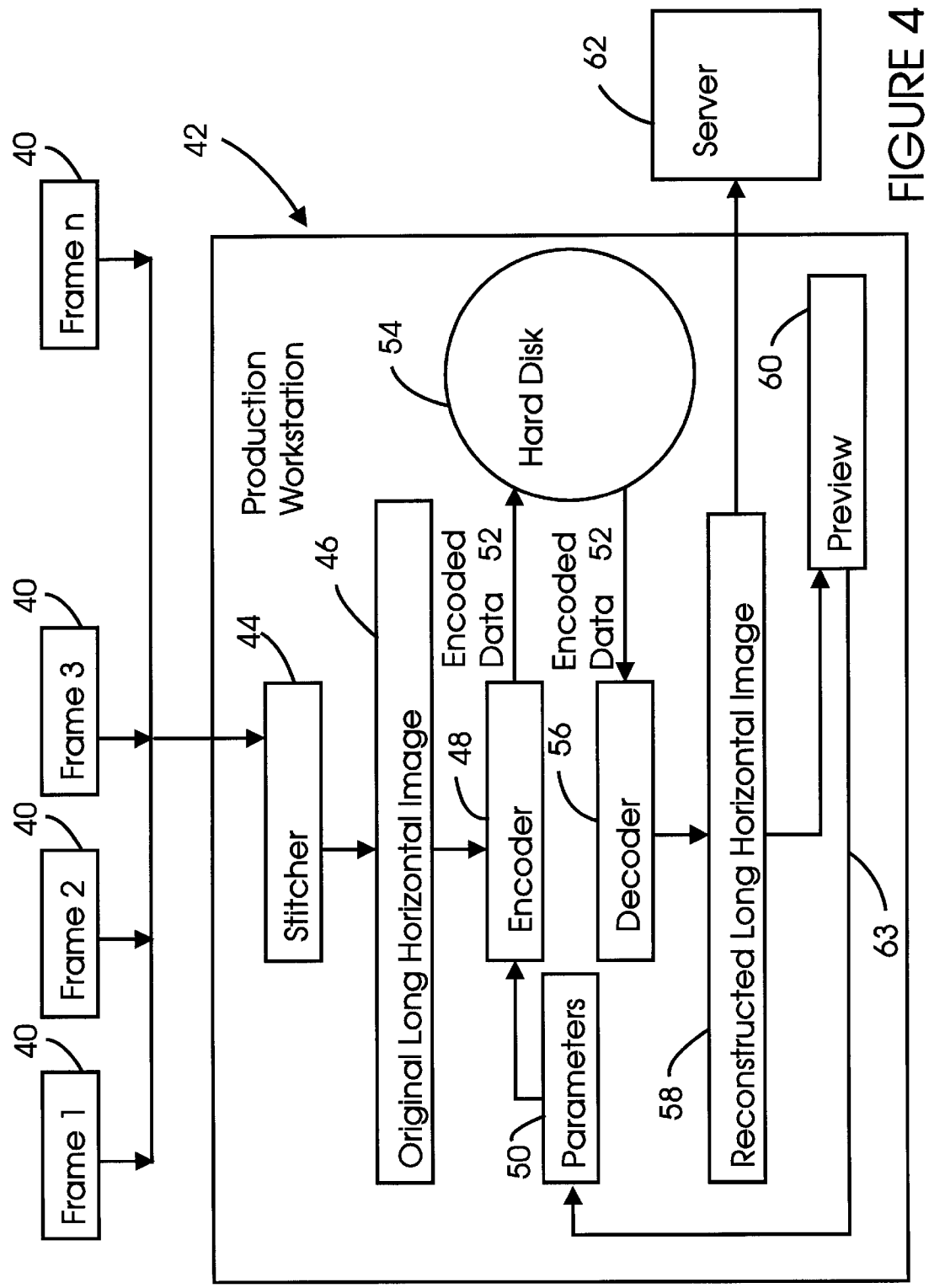
FIG. 4 is a simplified block diagram of a production tool which enables a content provider to create and preview a movie.

In FIG. 4 there is illustrated a production tool which enables a content provider to create a movie, preview it and interactively adjust the encoding parameters to fine-tune the production. A video or still camera (not shown) is used to generate a sequence of digital frames 40 constituting a movie. The frames 40 are input to a production tool 42 and assembled together by a stitcher unit 44 to form a single large digital image, preferably a long horizontal image 46.

The image 46, augmented by hot spot and object data, constitutes the raw movie data. The raw data is compressed by an encoder unit 48 using encoder parameters 50, and the output encoded data 52 is stored, typically on a hard disk 54. The data 52 is decompressed in a decoder unit 56, the output 58 of which is a reconstructed version of the original long horizontal image 46. The movie is then previewed by the producer using a display 60, exactly as it would appear on the client computer. The producer can adjust the encoder parameters in a feedback loop 63 to fine-tune the production. When the production is satisfactory, the tool stores the encoded data on a server 62, for distribution to clients.

Several movies can be linked together through the use of hot spots, in which case each movie is converted typically into a long horizontal image, encoded as described above, and stored on a server together with the hot spot location and link information.

Figure 5:
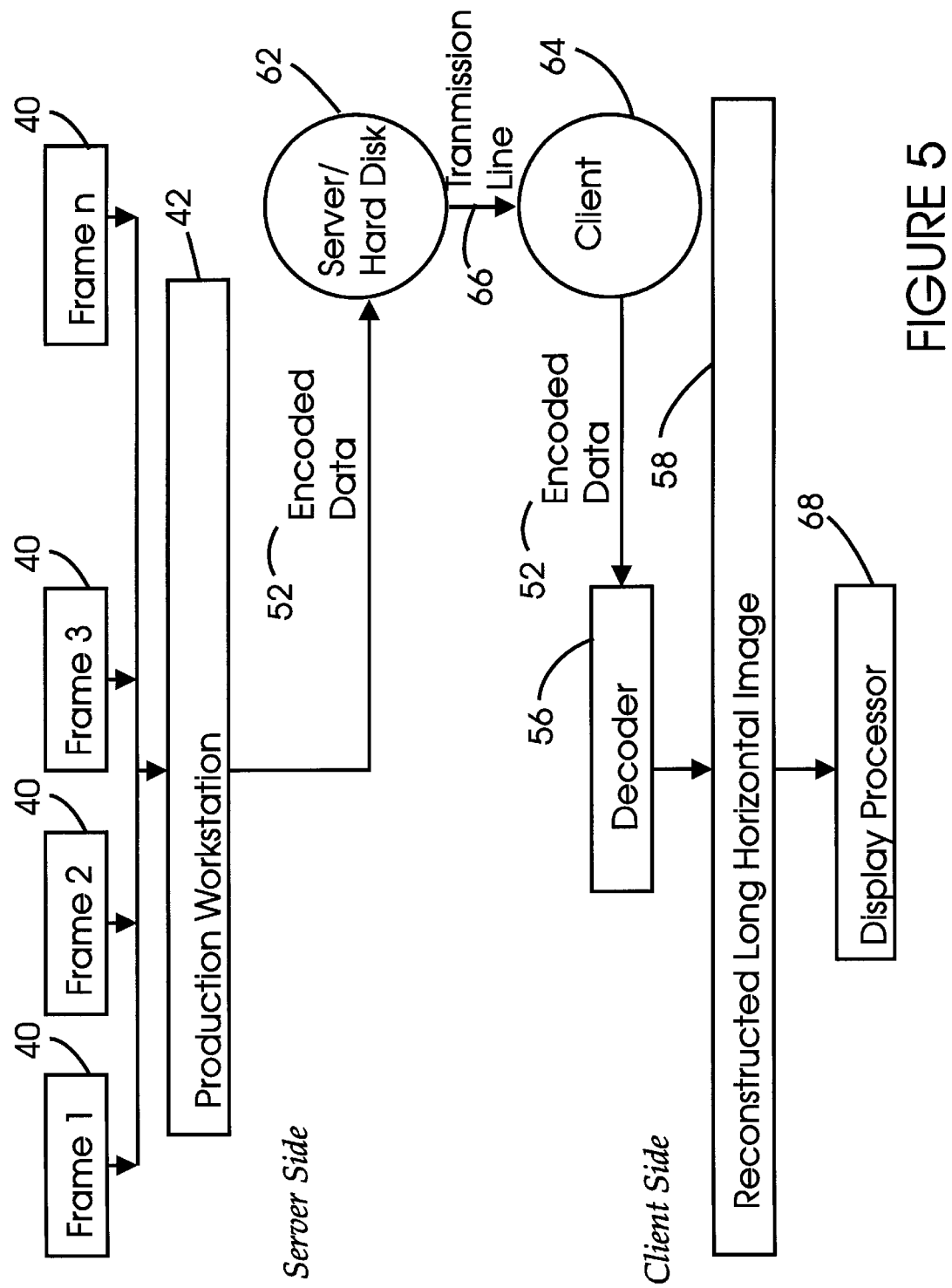
FIG. 5 illustrates a computer system which creates a movie using the production tool shown in FIG. 1.

FIG. 5 depicts the complete system. Upon request by a client computer 64, the server 62 (FIG. 4) delivers encoded data 52 (FIG. 4) along a transmission line 66. The client computer 64 decompresses the data in decoder unit 56 (FIG. 4), the output 58 of which is a reconstructed version of the original long horizontal image 46, residing on the client computer 64. A display processor 68 moves the viewing window in memory so as to give the effect of advancing the frames, as shown in FIG. 6.

Figure 6:
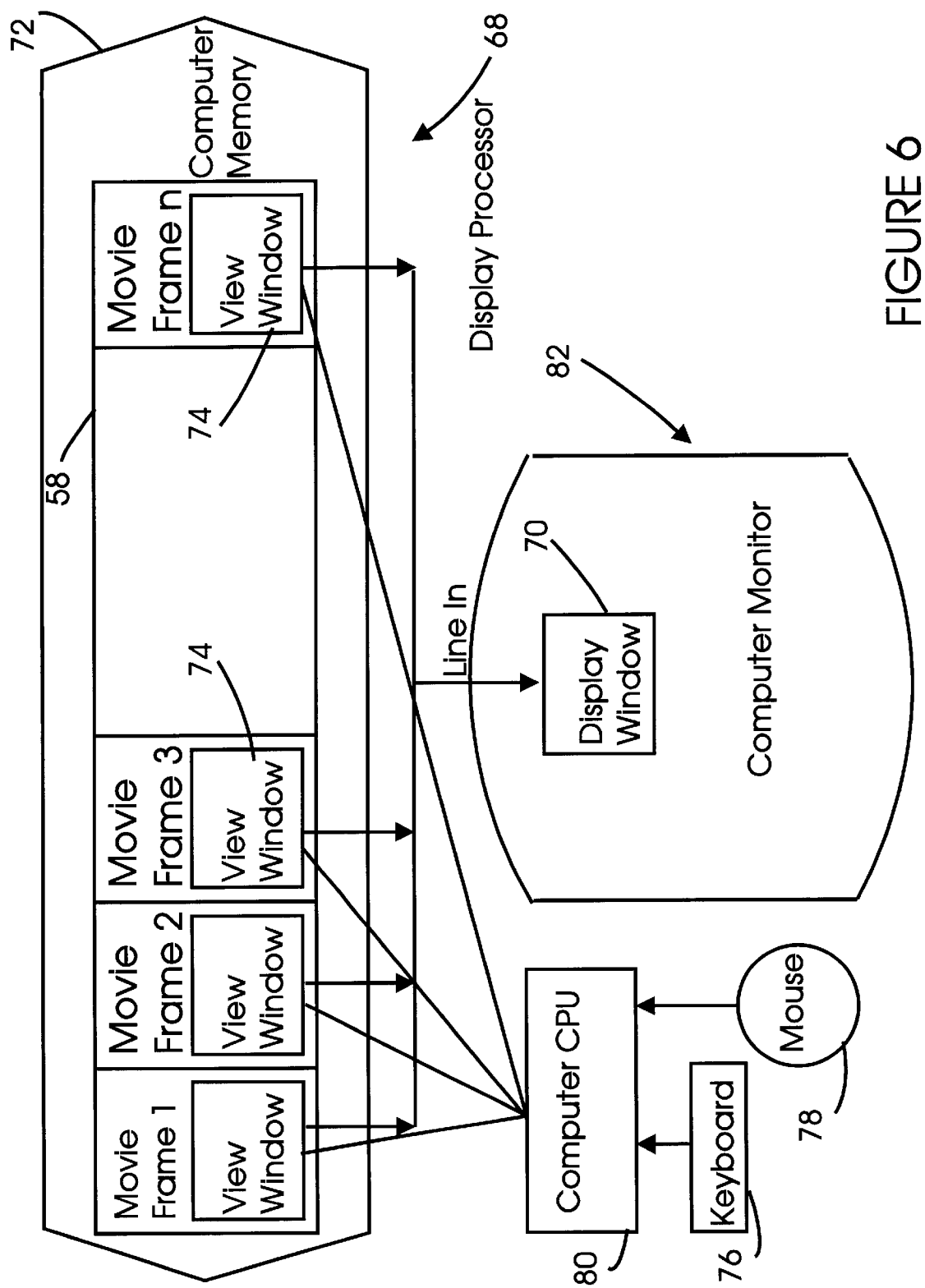
FIG. 6 is a simplified diagram, schematically illustrating a movie player which is controlled by the user's interactive pressing of the keyboard and clicking of the mouse.

FIG. 6 depicts the logistics in display processor 68 (FIG. 5) for the viewer on the client computer side to display the movie in a display window 70 from the reconstructed long horizontal image 58 stored in a memory 72. To initialize the movie, a viewing window 74 is positioned within the long horizontal image 58.

As the user presses a keyboard 76 or clicks a mouse 78 to advance the frames forward or backward, a client computer CPU 80 adjusts the viewing window 74 one frame forward or backward within the long horizontal image 58, maintaining the same position relative to the frame, as shown in FIG. 6. The pixel data in the viewing window 74 is delivered to a computer monitor 82 and displayed in the fixed display window 70.

An important feature of the present invention is that although the viewing window 74 jumps in a regular fashion within the long horizontal image 58, the display window 70 preferably remains fixed within the computer monitor reference. A zoom in or out of the movie is accomplished by setting the display window size 70 to be larger or smaller than the size of viewing window 74, respectively.

Figure 7:
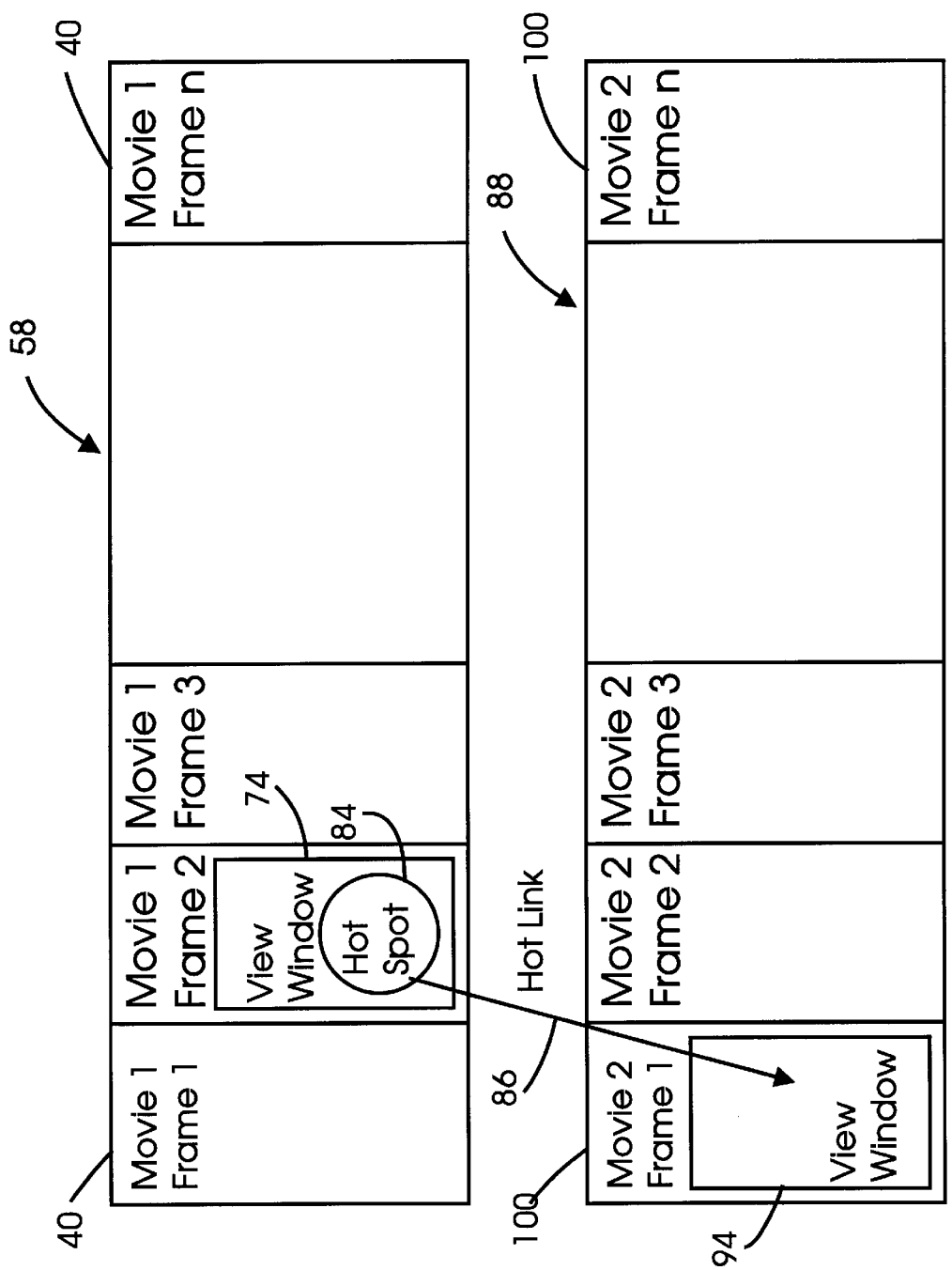
FIG. 7 is a simplified schematic diagram of the operation of a hot spot which links from one movie to another.

FIG. 7 illustrates the operation of hot spots. Hot spots 84 are highlighted areas within the frames 40 which constitute the reconstructed long horizontal image 58, and are typically flagged to the user by a change in the appearance of the mouse pointer when it is positioned within the hot spot of movie 1. Each hot spot is encoded with a link 86 to another movie, movie 2. Within the framework of the subject invention, a hot spot is encoded as a link from one long horizontal image 58 to another such image 88. When the user selects the hot spot 84 by clicking the mouse pointer on it, the viewing window 74, which was located within the first image 58, moves to a memory block located within the second image 88. This initializes the second movie, and the new viewing window 94 proceeds to advance forward and backward along the frames 100, giving the appearance of 3D motion in the new movie.

While the second movie is being downloaded, there can be a short wait, until enough data has been downloaded from the second movie to decompress the first slice of the second movie.

Figure 8:
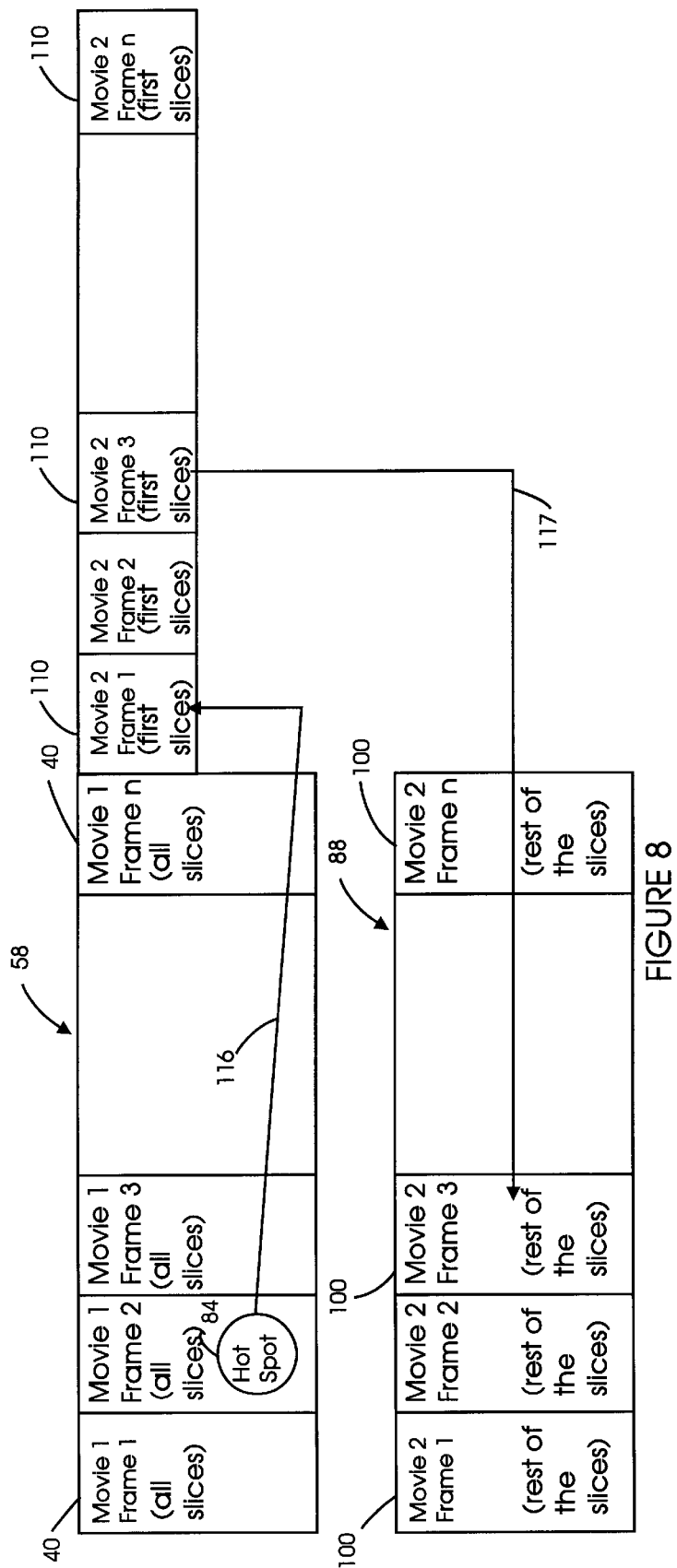
FIG. 8 is a simplified diagram of the operation of a hot spot which links from one movie to another without entailing any waiting time delay.

An alternate approach, which eliminates this delay, is illustrated in FIG. 8. As illustrated, the first slices of the frames 110 of the second movie are incorporated within the encoded database for the first movie. When the user clicks on the hot spot 84, a hot link 116 jumps over to the first frame 110 within the first slice of the second movie, which is already part of the data associated with the first movie, and, as such, has already been downloaded, thus eliminating the delay. The user can interact with the first slices of the second movie, advancing forward and backward through the frames 110 and zooming in and out, while the rest of the slices are being downloaded in background. Once these slices are available on the client computer, a link 117 then jumps from the first slices of the second movie to the next slices which are available. Specifically, FIG. 8 illustrates a user who is viewing the third frame 110 from the second movie at the point in time when the next slice arrives. The link 117 jumps to the third frame 100 within this next slice, thus affording a seamless transition to the second movie.

It is noted that the use of a horizontal shape for the large image described above, containing all of the movie frames, is not an essential element of the invention. Any large rectangular image which is tiled by the individual frames can be created by the production tool and used for displaying on the client side.

The present invention can be used as an effective means of progressively delivering large still images for on-line display. On account of their large file sizes, even after compression, such images are very time consuming to download. After they are delivered to the client computer, they are slow to bring up for display. Moreover, simple image maneuvers such as scrolling or zooming are enormous computational efforts and typically result in intensive memory swapping.

An innovative use of the present invention is to create a hierarchy of many image tiles from the original large image, at different resolutions. Larger tiles have lower resolution than smaller ones. Each tile is linked to those smaller higher resolution tiles contained within it through the use of hot spots and links. The tiles become the analogues of the movie frames. They are joined together to form one long horizontal image, as described above.

The view window begins with a low resolution tile containing hot spots. The user interactively clicks on a hot spot, indicating a request to display a zoom-in at that location. The hot spot links to the desired tile—the one containing the hot spot and with twice the resolution as the current tile being displayed. The view window jumps to that tile within the long horizontal image and quickly displays it, giving the appearance of a zoom-in. The user continues to zoom in and out in this manner.

Figure 9:
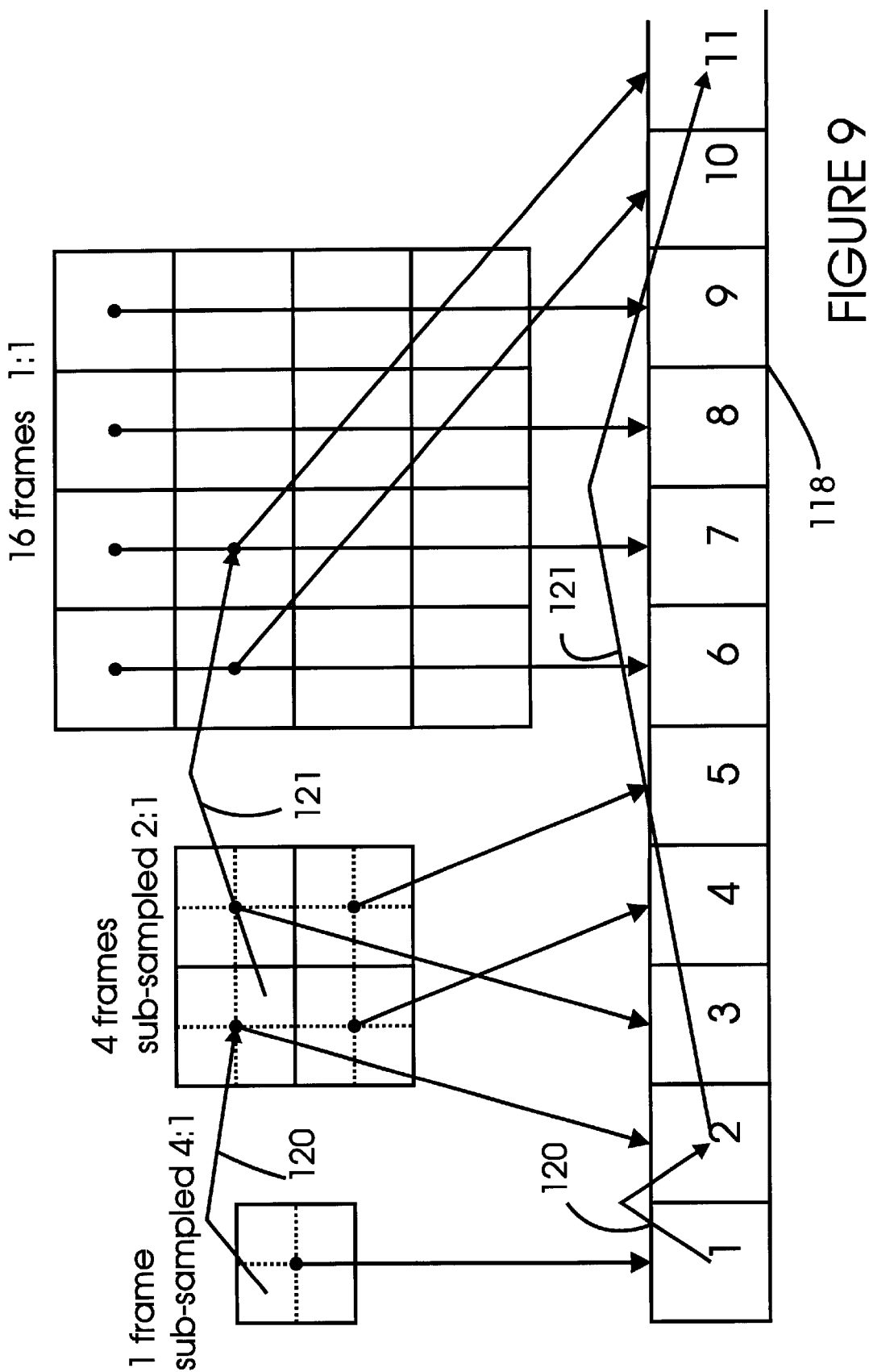
FIG. 9 is a simplified schematic diagram of a progressive viewer for large still images, enabling the viewer to quickly interactively gaze at the image while the data is streamed.

FIG. 9 illustrates an image processing system which applies the present invention to on-line progressive display of large still images. The first frame, or tile, is a low resolution version of the full original image, sub-sampled at 4:1 in each dimension. The next four tiles are each of the quadrants of the original image, sub-sampled at 2:1 in each dimension. The next sixteen tiles are the quadrants of the quadrants of the original image, at the original scale of 1:1. The tiles typically are joined together serially into a long horizontal image 118, as indicated by the mapping in FIG. 9.

The view window begins in tile number 1, and the client computer displays the first tile, which shows the user the entire image at low resolution (4:1). The user clicks on a hot spot area in the northwest quadrant of the image, and the hot link 120 jumps the view window over to tile number 2, which corresponds to the northwest quadrant at twice the scale (now 2:1). This gives the appearance of an instant gaze of that area of the image. The user then clicks on a hot spot area in the southeast quadrant of the current frame being displayed, and the hot link 121 jumps the view window over to tile number 11, which corresponds to the southeast quadrant, again at twice the scale (now 1:1). This gives the appearance of a deeper gaze.

The following calculations quantify the advantage which the subject invention has over simply sending the full images at each resolution, for progressive still image display.

Denote by $N=2^n$ the sub-sampling factor for the lowest resolution tile. Assume that this tile contains the full image. This would be the first tile displayed, enabling the user to preview the full image and then decide where to zoom in. Uncompressed, the size of this N:1 sub-sampled tile is $$\frac{1}{N^2}$$

of the full image size at 1:1 scale. For $0 \leq k \leq n$, denote by $m_k$ the number of $$\frac{N}{2^k} : 1$$

sub-sampled tiles created. Identifying 0 with the lowest resolution and n with the highest resolution, $m_k$ is then the number of tiles created at resolution k. The tiles at resolution k are still individually of size $$\frac{1}{N^2}$$

of the full image size, since their dimensions are only $$\frac{1}{2^k}$$

of the original image dimensions before the sub-sampling. The total size of all the resolution k tiles is thus $$\frac{m_k}{N^2}$$

of the original image.

On the other hand, the full image sub-sampled down to resolution k has size $$\frac{4^k}{N^2}$$

of the full image size; so provided $$\sum_{i=0}^{k} m_i < 4^k$$

the present invention is achieving superior delivery than simply sending the full image at resolution k. For large images where the higher resolution tiles are sparse, this can be a substantial gain. The effect of the compression has been ignored in the above discussion.

The choice of which high resolution tiles to encode is based on "areas of interest" within the image. The production tool enables the producer to hierarchically define which areas are of interest for gazing, in the full image and in each multi-resolution tile, up to the next-to-highest resolution. Since typically there is a relatively small number of areas of interest within the full image, the above calculation shows that the present invention affords an approach which has significant advantages.

The use of the factor two for zooming in the above discussion is for illustrative purposes only, and can be replaced by any zoom factor.

Generalizing the present invention, it is appreciated that the present invention creates a hierarchy of many image tiles from the original large image, at different resolutions, wherein each tile is linked to those smaller higher resolution tiles contained within it through the use of hot spots and links. They need not necessarily be joined together to form one long horizontal image, as described above.

Figure 10:
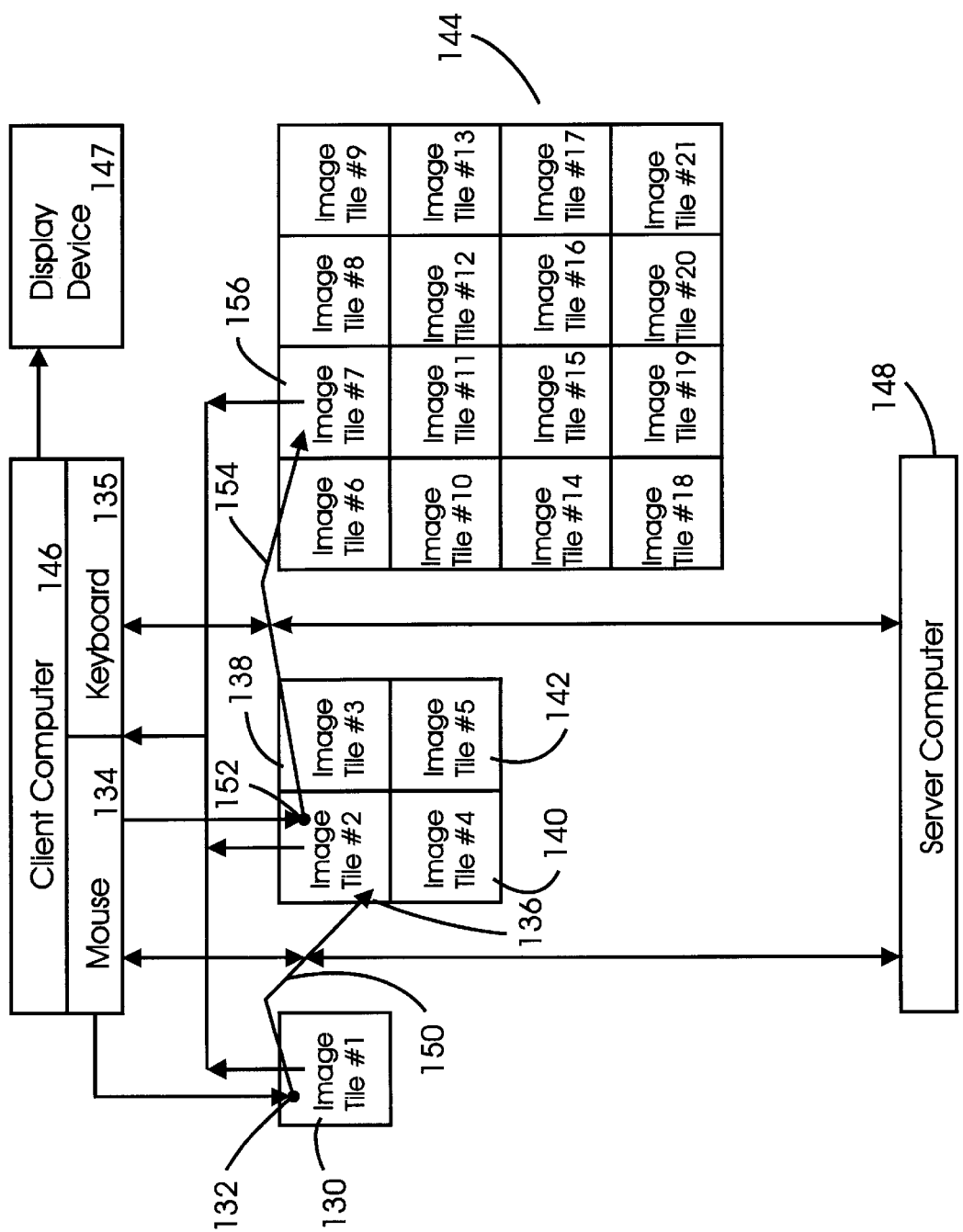
FIG. 10 is a generalized schematic diagram of a progressive viewer for large still images, enabling the viewer to interactively gaze at the image.

Referring now to FIG. 10, and as described hereinabove with reference to FIG. 9, the view window begins with a low resolution tile 130 containing hot spots. The user interactively clicks on a hot spot 132 by use of a mouse 134 or keyboard 135, indicating a request to display a zoom-in at that location. The hot spot links to the desired tile—the one containing the hot spot and with twice the resolution as the current tile being displayed. The user then sees that tile, indicated by reference numeral 136, giving the appearance of a zoom-in. The user continues to zoom in and out in this manner.

FIG. 10 illustrates an image processing system which applies the present invention to on-line progressive display of large still images. The first frame, or tile 130, is a low resolution version of the full original image, sub-sampled at 4:1 in each dimension. The next four tiles 136, 138, 140 and 142 are each of the quadrants of the original image, sub-sampled at 2:1 in each dimension. The next sixteen tiles, referred to collectively by reference numeral 144, are the quadrants of the quadrants of the original image, at the original scale of 1:1.

The view window begins in tile number 1, indicated by reference numeral 130, and the client computer 146 and associated display device 147, cooperating with a server computer 148, display the first tile, which shows the user the entire image at low resolution (4:1). The user clicks on a hot spot area 132 in the northwest quadrant of the image, and a hot link 150 causes the user to view tile number 2, indicated by reference numeral 136, which corresponds to the northwest quadrant at twice the scale (now 2:1). This gives the appearance of an instant gaze of that area of the image. The user then clicks on a hot spot area 152 in the northeast quadrant of the current frame being displayed, and a hot link 154 causes the viewer to view tile number 7, indicated by reference numeral 156, which corresponds to the northeast quadrant, again at twice the scale (now 1:1). This gives the appearance of a deeper gaze.

It is appreciated that the invention described hereinabove with particular reference to FIGS. 9 and 10 apply to any type of digital image, including panoramas.

Figure 11:
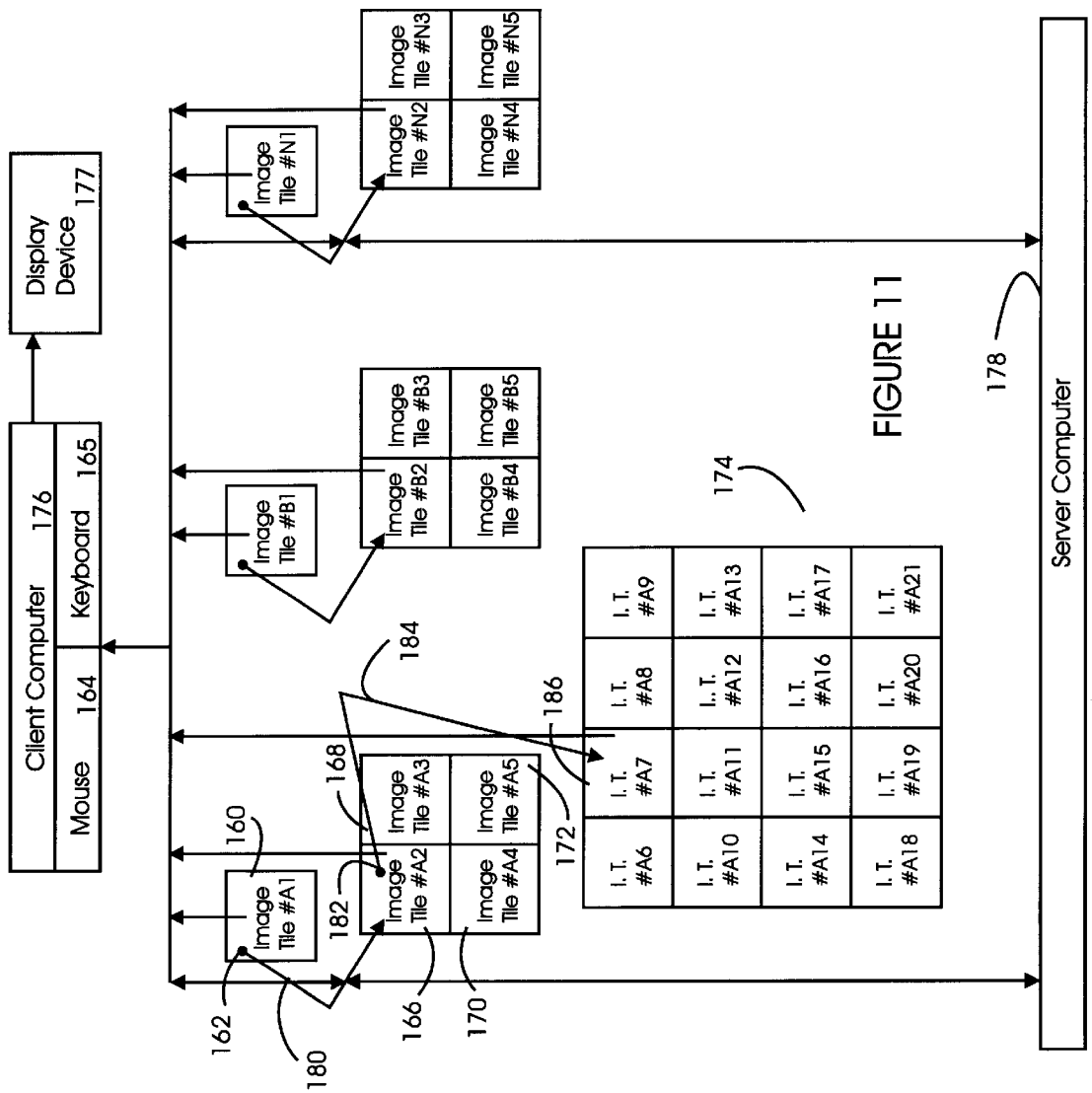
FIG. 11 is a generalized schematic diagram of a progressive viewer for moving pictures, enabling the viewer to interactively view the moving picture.

Referring now to FIG. 11, it may be appreciated that the invention described hereinabove and shown with generality in FIG. 10 may also be applied to movies, wherein each movie frame is rendered gazable in the manner illustrated in FIG. 10. Thus, for example, a first movie frame is defined as image tile A1 and a second movie frame is defined as image tile B1 and additional movie frames are similarly identified.

Image tile A1 is initially viewed as a low resolution tile 160 containing hot spots. The user interactively clicks on a hot spot 162 by use of a mouse 164 or keyboard 165, indicating a request to display a zoom-in at that location. The hot spot links to the desired tile—the one containing the hot spot and with twice the resolution as the current tile being displayed. The user then sees that tile, indicated by reference numeral 166, giving the appearance of a zoom-in. The user continues to zoom in and out in this manner.

FIG. 11 illustrates a movie processing system which applies the present invention to on-line progressive display of movies. The first frame, or tile 160, is a low resolution version of the full original movie frame A, sub-sampled at 4:1 in each dimension. The next four tiles 166, 168, 170 and 172 are each of the quadrants of the original image, sub-sampled at 2:1 in each dimension. The next sixteen tiles, referred to collectively by reference numeral 174, are the quadrants of the quadrants of the original image, at the original scale of 1:1.

The movie begins by displaying frame A, indicated by reference numeral 160, and the client computer 176 and associated display device 177, cooperating with a server computer 178, display the first tile, which shows the user the entire movie frame A at low resolution (4:1). The user clicks on a hot spot area 162 in the northwest quadrant of the image, and a hot link 180 causes the user to view tile number 2, indicated by reference numeral 166, which corresponds to the northwest quadrant at twice the scale (now 2:1). This gives the appearance of an instant gaze of that area of the movie frame A1. The user then clicks on a hot spot area 182 in the northeast quadrant of the current frame being displayed, and a hot link 184 causes the viewer to view tile number 7, indicated by reference numeral 186, which corresponds to the northeast quadrant, again at twice the scale (now 1:1). This gives the appearance of a deeper gaze.

The foregoing description applies equally to movie frame B1 and to all other movie frames having gazability. The user is free to move from movie frame to movie frame in any order and to gaze at one or more movie frames at will.

The above invention applies to all suitable forms of digital media, such as movies, including videos, animations, panoramas and object movies. Moreover, the present invention applies to interactive digital audio as well, whereby several audio clips are joined together in one long digital signal, and a signal segment is advanced to play different audio segments in response to user commands.

Figure 12:
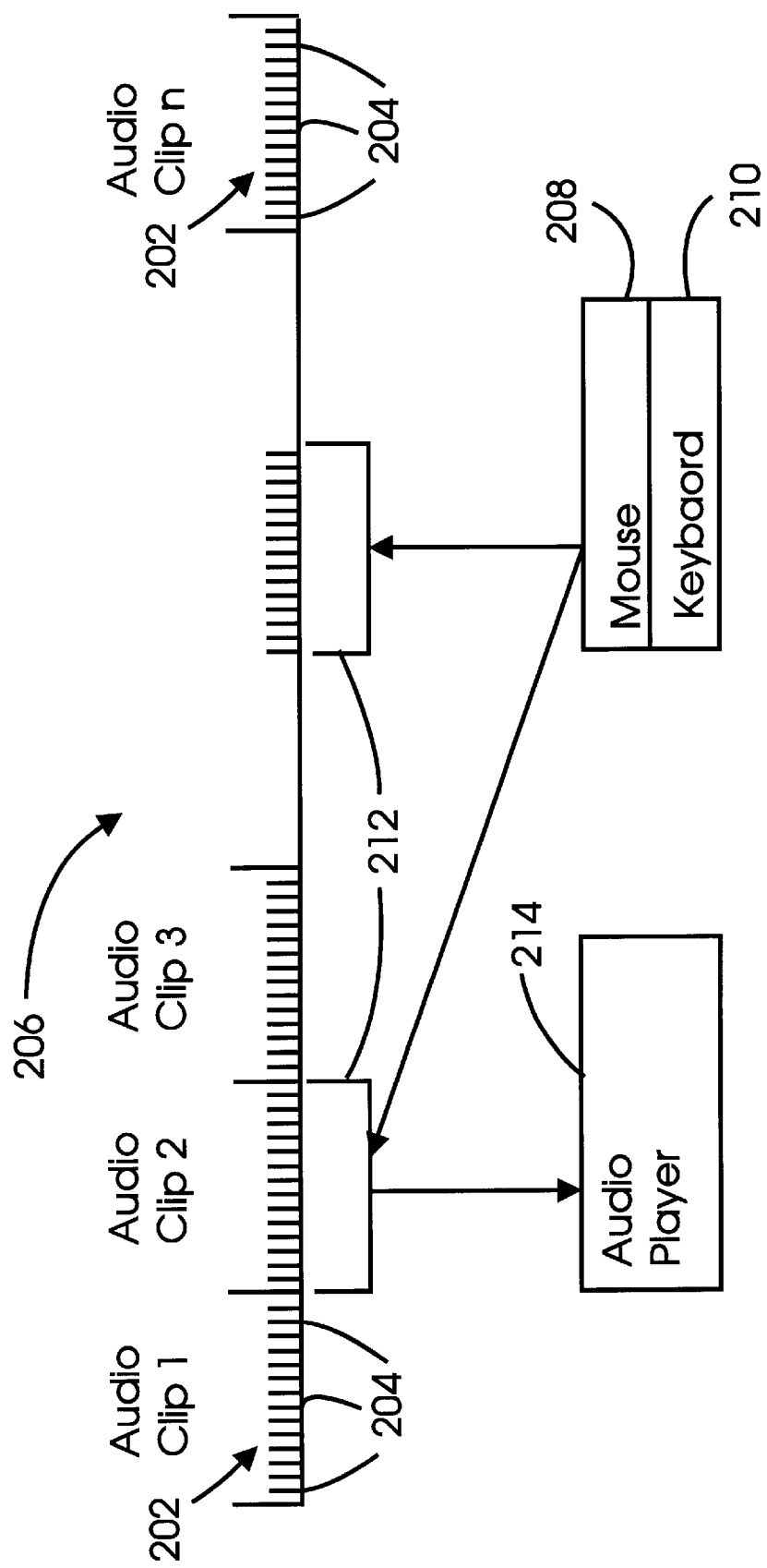
FIG. 12 is a simplified schematic diagram of an interactive audio system which plays audio clips in response to user input.

Reference is made to FIG. 12 which illustrates an interactive audio system which plays audio clips 202 in response to user input. The audio clips 202 can represent sound effects, which can be synchronized with frames of an interactive movie. Each audio clip 202 includes digitized audio samples 204, and the totality of samples for all of the audio clips are joined together into one long sequence 206 of samples. In response to operation of a user-controlled mouse 208 or keyboard 210, a sliding segment pointer 212 is positioned within the sequence 206. The samples within the sliding segment are transmitted to an audio player 214 for playing. The position of the sliding segment pointer 212 can be synchronized with the frame number of a movie, so that both audio and video can be provided to the user.

Advantages of using a long sequence of samples are easy memory access and efficient transmission. If the audio samples were stored individually, their memory locations would be randomly distributed, and consequently jumping from one clip to another would be more time consuming. Transmission is effected using a single data stream rather than multiple data streams.

The present invention becomes even more advantageous if the audio content is compressed. If the compressed audio samples are stored individually, each compressed audio clip has to be decompressed from a separate data stream before it can be played. By joining the samples into one long sequence, the decompressor operates on a single compressed data stream, which is faster and more efficient.

It will be appreciated by persons skilled in the art that the various features and embodiments described hereinabove may be employed individually or in any suitable combination, all within the scope of the present invention.

What is claimed is:

1. A method for producing a moving picture comprising:

providing a digital image including the content of a multiplicity of individual images, the multiplicity of individual images comprising a plurality of individual images of an object in different orientations;

defining a view window which may be selectably superimposed over at least a portion of said digital image at a given time; and moving said view window over said digital image such as to view at least portions of said multiplicity of said individual images in a desired sequence thereby to define said moving picture, wherein said view window is superimposed sequentially over a portion of each of said plurality of individual images, so as to view generally the same portion of said object in each of said plurality of individual images, and whereby moving said view window over said plurality of individual images in different orientations provides a sensation of viewing movement of said object.

2. Apparatus for producing a moving picture comprising:
a digital image generator providing a digital image including the content of a multiplicity of individual images, the multiplicity of individual images comprising a plurality of individual images of an object in different orientations;
a view window which may be selectably superimposed over at least of portion of said digital image at a given time; and
a user operated window controller for moving said view window over said digital image such as to view at least portion of said multiplicity of said individual images in a desired sequence thereby to define said moving picture,
wherein said view window is superimposed sequentially over a portion of each of said plurality of individual images so as to view generally the same portion of said object in each of said plurality of individual images, and
whereby moving said view window over said plurality of individual images in different orientation provides a sensation of viewing movement of said object.

3. A digital image display system comprising:
a memory storing digital images in an interactively accessible data structure, which stores pre-manipulated image content in multiple image content units, wherein said data structure joins all of the image content units together into a large digital image, and wherein the large digital image comprises a movie and each image content unit constitutes a frame of the movie; and
a downloader downloading data stored in said memory in a manner such that any of the stored image content units may be accessed at at least a minimum quality prior to completion of downloading.

4. A digital image display system comprising:
a memory storing digital images in an interactively accessible data structure, which stores pre-manipulated image content in multiple image content units, wherein said data structure joins all of the image content units together into a large digital image, and
wherein the large digital image comprises a large still image and each image content unit constitutes a tile of the large still image at a given resolution, said multiple image content units comprising multiple at least partially redundant tiles of said large still image at varying resolutions; and
a downloader downloading data stored in said memory in a manner such that any of the stored image content units may be accessed at at least a minimum quality prior to completion of downloading.

5. A digital image display system according to claim 3 and also comprising a user-operated controller for advancing frames in the movie by moving a view window within the large digital image.

6. A digital image display system according to claim 5 and wherein said view window moves in such a way that it maintains the same relative position within each frame within the movies, so that advancement of the view window makes it seem as if the frames are being advanced.

7. A digital image display system according to claim 4 and also comprising a user-operated controller for user selectable gazing in said large still image by moving a view window within the large digital image.

8. A digital image display method comprising:
storing digital images in an interactively accessible data structure, which stores pre-manipulated image content in multiple image content units, wherein said data structure joins all of the image content units together into a large digital image, and wherein the large digital image comprises a movie and each image content unit constitutes a frame of the movie; and
downloading said digital images in a manner such that any of the stored image content units may be accessed at at least a minimum quality prior to completion of downloading.

9. A digital image display method comprising:
storing digital images in an interactively accessible data structure, which stores pre-manipulated image content in multiple image content units, wherein said data structure joins all of the image content units together into a large digital image, and wherein the large digital image comprises a large still image and each image content unit constitutes a tile of the large still image at a given resolution, said multiple image content units comprising multiple at least partially redundant tiles of said large still image at varying resolutions; and
downloading said digital images in a manner such that any of the stored image content units may be accessed at at least a minimum quality prior to completion of downloading.

10. A digital image display method according to claim 8 and also comprising advancing frames in the movie by moving a view window within the large digital image.

11. A digital image display method according to claim 10 and wherein said view window moves in such a way that it maintains the same relative position within each frame within the movies, so that advancement of the view window makes it seem as if the frames are being advanced.

12. A digital image display method according to claim 9 and also comprising user selectable gazing in said large still image by moving a view window within the large digital image.

13. A method for simulating an interactive movie on a computer display from a sequence of digital frames, as data is received on-line, comprising the steps of:
joining the digital frames together to form a large digital image;
encoding said large digital image to generate encoded image data;
storing said encoded image data;
transmitting said encoded image data to a client computer upon request;
decoding said encoded image data to generate a reconstructed large digital image; and
displaying moving window views of said reconstructed large digital image in a fixed display window, in response to keyboard presses and mouse clicks by a user, to exhibit the same effect as if advancing forward and backward through the digital frames, in order to simulate interactive motion on said client computer display device.

14. The method according to claim 13, wherein said steps of joining, encoding, storing, transmitting, and decoding are applied to a plurality of digital frame sequences, corresponding to a plurality of movies, linked together through hot spots.

15. The method according to claim 14, wherein said step of storing includes storing hot spot locations and link information, along with said encoded image data.

16. The method according to claim 15, wherein said step of transmitting includes transmitting hot spot locations and link information along with the plurality of said encoded image data.

17. The method according to claim 16, wherein said step of displaying also uses said hot spot locations, and further comprises the steps of:
  processing mouse clicks by the user in hot spot locations to link to another of said plurality of reconstructed large digital images; and
  moving a window view from a position within a first large digital image to a position within a second large digital image linked thereto at a hot spot.

18. The method according to claim 17, wherein a portion of said second large digital image is stored within the encoded data for the first large digital image, and wherein said moving a window view comprises the steps of:
  moving a window view from a position within the first large digital image to another position within said first large digital image corresponding to the location of the portion of said second large digital image contained therein; and
  moving a window view from said position within said first large digital image to a corresponding position within said second large digital image.

19. The method according to claim 13, wherein said large digital image is a long horizontal image containing all of the individual movie frames.

20. An image processing system, operative on a sequence of individual digital frames to produce an on-line interactive movie, comprising:
  a stitching unit for assembling the digital frames together to form a large digital image;
  an encoder for compressing said large digital image into encoded image data;
  a storage device for archiving said encoded image data;
  a transmitter for delivering said encoded image data to a client computer upon request;
  a decoder for decompressing said encoded image data, to generate a reconstructed large digital image; and
  a monitor for displaying moving window views of said reconstructed large digital image in a fixed display window, in response to keyboard presses and mouse clicks by a user, exhibiting the same effect as if advancing forward and backward through said digital frames, in order to simulate interactive motion on said client computer display device.

21. The system as claimed in claim 20, wherein said stitching unit, encoder, storage device, transmitter and decoder operate on a plurality of digital frame sequences, corresponding to a plurality of movies, linked together through hot spots.

22. The system as claimed in claim 21, wherein said storage device archives the location and link information of said hot spots along with the plurality of said encoded image data.

23. The system as claimed in claim 22, wherein said transmitter delivers the hot spot and link information, along with said encoded image data.

24. The system as claimed in claim 23, wherein said monitor uses hot spot locations to display moving window views, by means of:
  a processing unit for processing mouse clicks by the user in hot spot locations in order to link to another of said plurality of reconstructed large digital images; and
  a pointer in memory for moving said window view from a position within a first large digital image to a position within a second large digital image which is linked thereto at said hot spot locations.

25. The system as claimed in claim 24, wherein a portion of said second large digital image is stored within the encoded data for said first large digital image, and wherein said pointer in memory comprises:
  a first pointer in memory for moving said window view from a position within said first large digital image to another position within said first large digital image corresponding to the location of the portion of said second large digital image contained therein; and
  a second pointer in memory for moving said window view from said position within said first large digital image to a corresponding position within second large digital image.

26. The system as claimed in claim 20, wherein said large digital image is a long horizontal image containing individual movie frames.

27. A method for simulating interactive audio from a sequence of digital audio clips, as data is received on-line, comprising the steps of:
  joining said digital clips together to form a long digital signal;
  encoding said long signal to generate encoded audio data;
  storing said encoded audio data;
  transmitting said encoded audio data to a client computer upon request;
  decoding said encoded audio data to generate a reconstructed long digital signal; and
  playing changing segments of said reconstructed long signal, in response to keyboard presses and mouse clicks by a user, to exhibit the same effect as if advancing through said digital audio clips.

28. An audio processing system operative on a sequence of digital audio clips, to produce on-line interactive audio, said system comprising:
  a stitching unit for joining said digital audio clips together to form a long digital signal;
  an encoder for compressing said long digital signal into encoded audio data;
  a storage device for archiving said encoded audio data;
  a transmitter for delivering said encoded audio data to a client computer upon request;
  a decoder for decompressing said encoded audio data to generate a reconstructed long digital signal; and
  a sound player for playing changing segments of said reconstructed signal, in response to keyboard presses and mouse clicks by a user, exhibiting the same effect as if advancing through said digital audio clips.

29. A method according to claim 13 wherein said encoding and decoding operate according to a progressive JPEG algorithm.

30. An image processing system according to claim 20 wherein said encoder and decoder operate according to a progressive JPEG algorithm.

31. A method for simulating an interactive three-dimensional object movie or panorama on a computer display, as data is received on-line, comprising the steps of:
  arranging a sequence of individual digital frames from an object movie or panorama video strip in a sequence from top to bottom to form a long vertical image;
  compressing said long vertical image;
  storing the compressed data;
  transmitting the compressed data to a client computer;
  decompressing the compressed data on-line to reconstruct said long vertical image on the client computer, while the compressed data is being transmitted; and progressively displaying selected window views to simulate interactive object motion or panorama navigation on the client computer display device, as the data for the complete construction of these views becomes available.

32. A method according to claim 31 and also comprising the steps of:

separating the individual frames from the long vertical image on the client computer, as they become available; and joining the individual frames into a large digital image on the client computer and wherein: said step of progressively displaying operating by displaying sliding window views of said large digital image.

33. The method according to claim 31, wherein the compressing of said long vertical image is performed by encoding horizontal bands of image data in succession.

34. The method according to claim 33 wherein said compressing is performed by a JPEG encoder.

35. The method according to claim 31, wherein the compressing of said long vertical image is carried out in a progressive mode, resulting in a series of compressed data slices.

36. The method according to claim 35, wherein the compressing is performed by a progressive mode JPEG encoder.

37. The method according to claim 31, wherein said storing of the compressed data creates a single stream database of compressed image data on the server, and the transmission of said compressed data uses a single data channel.

38. The method according to claim 31, wherein said storing of the compressed data creates a multiple stream database of compressed image data on the server, and the transmission of the compressed data uses multiple data channels.

39. The method according to claim 31, wherein the decompressing of the compressed data is performed by decoding horizontal bands of image data in succession.

40. The method according to claim 39, wherein said decompressing is performed by a JPEG decoder.

41. The method according to claim 31, wherein the decompressing of the compressed data is carried out in a progressive mode, resulting in a series of decompressed data slices.

42. The method according to claim 41, wherein said decompressing is performed by a progressive mode JPEG decoder.

43. The method according to claim 41, wherein the decompressing of said compressed data comprises the steps of decompressing the individual compressed image slices, and integrating the slices as they become available so as to obtain successively enhanced video frames.

44. The method according to claim 32, wherein said progressively displaying is carried out by a viewing window which jumps from frame to frame, as each successive frame is made available.

45. The method according to claim 32, wherein said progressively displaying is carried out by a viewing window which moves smoothly from frame to frame, as each successive frame is made available.

46. Apparatus for simulating an interactive three-dimensional object movie or panorama on a computer display, as data is received on-line, comprising:

a frame composer arranging a sequence of individual digital frames from an object movie or panorama video strip in a sequence from top to bottom to form a long vertical image;

a compressor compressing said long vertical image;

a memory storing the compressed data;

a transmitter transmitting the compressed data to a client computer;

a decompressor decompressing the compressed data on-line to reconstruct said long vertical image on the client computer, while the compressed data is being transmitted; and a display driver progressively displaying selected window views to simulate interactive object motion or panorama navigation on the client computer display device, as the data for the complete construction of these views becomes available.

47. Apparatus according to claim 46 and also comprising:

a frame separator separating the individual frames from the long vertical image on the client computer, as they become available; and a stitching device joining the individual frames into a large digital image on the client computer and wherein:

said display driver operates by displaying sliding window views of said large digital image.

48. Apparatus according to claim 46, wherein the compressor operates on said long vertical image by encoding horizontal bands of image data in succession.

49. Apparatus according to claim 48 wherein said compressor comprises a JPEG encoder.

50. Apparatus according to claim 46, wherein said compressor operates on said long vertical image in a progressive mode, resulting in a series of compressed data slices.

51. Apparatus according to claim 50, wherein said compressor comprises a progressive mode JPEG encoder.

52. Apparatus according to claim 46, wherein said memory includes a single stream database of compressed image data on the server, and the transmitter employs a single data channel.

53. Apparatus according to claim 46, wherein said memory includes a multiple stream database of compressed image data on the server, and the transmitter employs multiple data channels.

54. Apparatus according to claim 46, wherein said decompressor operates by decoding horizontal bands of image data in succession.

55. Apparatus according to claim 44, wherein said decompressor comprises a JPEG decoder.

56. Apparatus according to claim 46, wherein said decompressor operates on the compressed data in a progressive mode, resulting in a series of decompressed data slices.

57. Apparatus according to claim 56, wherein said decompressor comprises a progressive mode JPEG decoder.

58. Apparatus according to claim 56, wherein said decompressor operates on said compressed data by decompressing the individual compressed image slices, and integrating the slices as they become available so as to obtain successively enhanced video frames.

59. Apparatus according to claim 47, wherein said display driver operates by causing a viewing window to jump from frame to frame, as each successive frame is made available.

60. Apparatus according to claim 47, wherein said display driver operates by causing a viewing window to move smoothly from frame to frame, as each successive frame is made available.

61. An image processing system operative on an object movie or panorama film strip for providing interactive on-line simulation of a three-dimensional object movie or panorama comprising:

an A/D converter for converting the film strip into digital data;

a production unit for converting the digital data into a long vertical digital image;

an encoder for compressing said long vertical image so that it can be efficiently stored on a server computer storage device and further transmitted to client computers;

a transmitter for sending the compressed image data as a data stream to a client computer upon request; and a decoder for decompressing the data stream on the client computer into image data, and arranging the image data into a form suitable for interactive display on-line, as the data is received.

62. The system as claimed in claim 61, wherein said encoder comprises a progressive compressor and a bit rate controller, for producing compressed image slices.

63. The system as claimed in claim 62, wherein said decoder comprises a progressive decompressor for the compressed slices and integrator for accumulating the slices into image data.

64. A method for producing interactive media comprising:

providing a digital file including content of a multiplicity of individual interactively accessible digital content units;

storing said digital file in an interactively accessible data structure;

downloading said digital file in a manner such that any of the stored multiplicity of individual interactively accessible digital content units may be accessed at at least a minimum quality prior to completion of downloading;

defining a pointer which may be selectably pointed at at least a portion of said digital file at a given time; and moving said pointer over said digital file so as to access at least portions of said multiplicity of said individual interactively accessible digital content units in a desired sequence.

65. Apparatus for producing interactive media, said apparatus comprising:

a digital file generator providing a digital file including the content of a multiplicity of interactively accessible digital content units;

a memory storing said digital file in an interactively accessible data structure;

a downloader downloading data stored in said memory in a manner such that any of the stored multiplicity of individual interactively accessible digital content units may be accessed at at least a minimum quality prior to completion of downloading;

a pointer which may be selectably pointed to at least a portion of said digital file at a given time; and a user-operated pointer controller for moving said pointer over said digital image such as to view at least potions of said multiplicity of said interactively accessible digital content units in a desired sequence.

* * * * *